(12) United States Patent
Tsubota et al.

(10) Patent No.: US 11,075,586 B2
(45) Date of Patent: Jul. 27, 2021

(54) SOLAR POWER SYSTEM AND CONVERTER

(71) Applicant: OMRON Corporation, Kyoto (JP)

(72) Inventors: Yasuhiro Tsubota, Moriyama (JP);
Masao Mabuchi, Moriyama (JP);
Takao Mizokami, Ritto (JP); Kenji Kobayashi, Moriyama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/638,491

(22) PCT Filed: Feb. 27, 2018

(86) PCT No.: PCT/JP2018/007210
§ 371 (c)(1),
(2) Date: Feb. 12, 2020

(87) PCT Pub. No.: WO2019/043996
PCT Pub. Date: Mar. 7, 2019

(65) Prior Publication Data
US 2020/0274460 A1 Aug. 27, 2020

(30) Foreign Application Priority Data
Sep. 4, 2017 (JP) .............................. JP2017-169536

(51) Int. Cl.
*H02M 1/00* (2006.01)
*H02M 7/44* (2006.01)
*H02M 7/48* (2007.01)

(52) U.S. Cl.
CPC ................. *H02M 7/4826* (2013.01)

(58) Field of Classification Search
CPC ........ H02M 7/4826; H02M 7/42; H02M 7/44; H02M 7/53; H02M 7/537; H02M 2001/007; H02M 1/0067; H02M 1/007
See application file for complete search history.

(56) References Cited

U.S. PATENT DOCUMENTS

| 4,823,247 A | * | 4/1989 | Tamoto | .................. | H02J 9/062 |
| | | | | | 363/16 |
| 5,119,283 A | * | 6/1992 | Steigerwald | ............ | H02M 1/10 |
| | | | | | 363/37 |

(Continued)

FOREIGN PATENT DOCUMENTS

| CN | 104242349 A | 12/2014 |
| CN | 104617873 A | 5/2015 |

(Continued)

OTHER PUBLICATIONS

An English translation of the International Search Report("ISR") of PCT/JP2018/007210 dated Apr. 10, 2018.

(Continued)

*Primary Examiner* — Gary L Laxton
(74) *Attorney, Agent, or Firm* — Metrolex IP Law Group, PLLC

(57) ABSTRACT

A converter is configured for connecting between a solar cell and an inverter configured to convert direct-current power output from the solar cell into alternating current power, and the converter is configured to increase the potential-to-ground at the negative terminal of the solar cell to greater than the potential-to-ground at the negative terminal of the inverter when outputting the direct-current power generated by the solar cell to the inverter side.

20 Claims, 26 Drawing Sheets

(56) References Cited

U.S. PATENT DOCUMENTS

| | | | | |
|---|---|---|---|---|
| 6,949,915 | B2* | 9/2005 | Stanley | H02M 1/4208 323/207 |
| 7,440,300 | B2* | 10/2008 | Konishi | H02J 3/38 323/222 |
| 7,706,163 | B2* | 4/2010 | Tan | H02M 7/487 363/132 |
| 8,130,524 | B2* | 3/2012 | Lee | H02M 3/1582 363/132 |
| 2009/0201706 | A1* | 8/2009 | Zacharias | H02M 7/48 363/123 |
| 2011/0228578 | A1* | 9/2011 | Serpa | H02M 3/158 363/132 |
| 2015/0256104 | A1* | 9/2015 | Fu | H02M 7/483 363/131 |
| 2016/0126742 | A1 | 5/2016 | Ayai et al. | |
| 2016/0268890 | A1 | 9/2016 | Ayai et al. | |
| 2016/0359415 | A1* | 12/2016 | Friebe | H02M 1/44 |
| 2017/0133921 | A1 | 5/2017 | Okumura et al. | |
| 2018/0083547 | A1 | 3/2018 | Tsubota et al. | |
| 2018/0150096 | A1* | 5/2018 | Nomura | G05F 1/66 |

FOREIGN PATENT DOCUMENTS

| | | |
|---|---|---|
| JP | 2010-273438 A | 12/2010 |
| JP | 2011-78290 A | 4/2011 |
| JP | 2012-257342 A | 12/2012 |
| JP | 2018-50377 A | 3/2018 |
| TW | 201539966 A | 10/2015 |
| TW | 201603472 A | 1/2016 |

OTHER PUBLICATIONS

The Written Opinion("WO") of PCT/JP2018/007210 dated Apr. 10, 2018.

The Taiwanese Office Action dated Dec. 7, 2018 in a counterpart Taiwanese Patent application.

"Cuts Output by Almost 70% in One Year, What is PID?", Mega Solar Business, retrieved on Sep. 13, 2016, Internet URL http://techon.nikkeibp.co.jp/atcl/feature/15/302961/010500010/?ST=msb &P=1, pp. 1-6, Nikkei BP Inc., Japan, Concise explanation of relevance provided in the specification.

\* cited by examiner

SOLAR POWER SYSTEM AND CONVERTER

FIELD

The present invention relates to a solar power system and to a converter.

BACKGROUND

In a solar power system, which uses light from the sun to generate electricity, a solar cell is connected to a commercial power grid or load device via a power conditioner that includes an inverter; the solar cell provides the electricity generated in the solar cell to the commercial power grid or a load device.

Solar power systems have in recent years been configured for higher voltages; and, given the increased efficiency of inverters, the solar power system may also be configured without transformers. The configurations have resulted in cases where there is a large potential difference between the solar cell and a frame that is grounded. It is known that the difference in potential generates a leakage current and, with the presence of external factors such as humidity and temperature, i.e., high temperature and high humidity, may cause potential induced degradation (PID).

FIG. 15 is a conceptual diagram for describing one example of the PID phenomenon. FIG. 15 schematically illustrates a single solar cell string 1S provided to a solar cell 10 in a solar power system. The solar cell 10 is equipped with a plurality of solar cells strings connected in parallel. The solar cell string 1S is configured from a plurality of solar cell modules 1 (solar panels) connected in series and is connected to a commercial power grid 45 via a power conditioner PCS. Each of the solar cell modules 1 in the solar cell string 1S receives light from the sun in the daytime and generates electricity, and thereby generates a potential difference between a positive input terminal 301 and a negative input terminal 302.

FIG. 16 schematically illustrates the structure of a solar cell module 1. As illustrated in FIG. 16, the solar cell module 1 includes a frame 11, a backsheet 12, a cell 13, glass 14, and a sealing material 15.

The cell 13 includes a semiconductor layer (e.g., a photoelectric layer) that uses the photovoltaic effect to convert light energy to electricity. The light receiving side of the cell 13 is provided with the glass 14, while the non-receiving side is provided with the backsheet 12. The sealing material 15 fills between the glass 14 and backsheet 12, and the cell 13, sealing the cell 13. The frame 11 is provided on the external periphery of the solar cell module 1 and is used as a support stage or the like for securing the solar cell module 1 at installation. The frame is also made of a conductive metal and is grounded.

As illustrated in FIG. 16, the potential-to-ground of the cells 13 in the solar cell modules 1 connected in series is positive at the solar cell module 1 closer to the input terminal 301 and negative closer to the solar cell module 1 at the input terminal 302. If this potential-to-ground increases and, as illustrated by the arrow in FIG. 16, a leakage current is generated between the cell 13 in the solar cell module 1 and the frame 11, or between the moisture 91 clinging on the surface of the glass and the cell 13, and the sodium ions in the glass 14 move to the cell 13 inhibiting the migration of elections and reducing the performance of the cell 13. In other words, PID occurs.

RELATED ART DOCUMENTS

Non-Patent Documents

Non-Patent Document 1 Mega Solar Business: Trouble, Nikkei BP Inc., [non-official translation] "Cuts Output by Almost 70% in One Year, What is PID?", (retrieved) 13 Sep. 2016, Internet URL http://techon.nikkeibp.co.jp/atcl/feature/15/302961/010500010/?ST=msb&P=1

SUMMARY

Technical Problem

The decline in performance due to PID becomes more striking as the potential-to-ground for the solar cell module 1 increases. Therefore, the decline in performance due to PID is becoming more of a problem as the solar power system is configured to supply higher and higher voltages.

However, it is also known that the solar modules may gradually recover from the performance decline at nighttime when the solar cell module no longer generates energy and the potential-to-ground is small. This recovery may occur even for cases where PID caused a decline in the performance of the solar cell module. However, nighttime recovery is gradual and may not necessarily be sufficient; therefore, one proposed solution is to provide a device that supplies a voltage to the solar cell module, which is the inverse of the voltage during power generation, to recover from the decline in performance caused by PID. Even in this case however, if the amount recovered during nighttime is less than the amount of decline during the daytime then the performance decline continues. Therefore, the disadvantage remains that the proposed method does not necessarily resolve the decline in performance due to PID. Thin-film silicon solar cell modules may temporarily recover from performance decline due to PID by applying a reverse of the voltage at power generation. However, given the more rapid degradation during power generation thereafter, this technique of applying the reverse of the voltage during power generation to recover from performance decline is problematic for thin-film silicon solar cell modules.

Solution to Problem

Therefore, embodiments of the present invention aim to provide techniques for minimizing the decline in performance of the solar cell due to PID.

Solution to Problem

As an example the following configurations are adopted as examples of addressing the above mentioned problems. One example in the present description is a converter configured for connecting between a solar cell and an inverter configured to convert direct-current power output from the solar cell into alternating current power, and configured to increase the potential-to-ground at the negative terminal of the solar cell to greater than the potential-to-ground at the negative terminal of the inverter when outputting the direct-current power generated by the solar cell to the inverter side.

The converter prevents the potential-to-ground of the negative terminal in the solar cell from being negative according to the above configuration, and minimizes the decline in performance due to PID.

The above-described converter may include an inductor with one end connected to the negative terminal of the solar cell; a switching element configured for opening and closing a path between the positive terminal of the solar cell and the positive terminal of the inverter with the other end of the inductor; and a diode with the cathode thereof connected to the other end of the inductor and the anode thereof connected to the negative terminal of the inverter.

Given the aforementioned configuration, the above-described converter treats the positive terminal of the solar cell and the positive terminal of the inverter as common, which prevents the potential-to-ground of the negative terminal in the solar cell from being negative and minimizes the decline in performance due to PID.

The above-described converter may include an inductor with one end connected to the negative terminal of the solar cell; a switching element configured for opening and closing a path between the positive terminal of the solar cell and the positive terminal of the inverter with the other end of the inductor; a diode with the cathode thereof connected to the other end of the inductor and the anode thereof connected to the negative terminal of the inverter; and a capacitor with one end thereof connected to the end of the inductor on the solar cell side and the other end thereof connected to the anode of the diode. Given the above configuration, the above-described converter minimizes the decline in performance due to PID.

The converter may be provided with a first converter unit configured to establish the potential-to-ground at the positive terminal of the solar cell as greater than or equal to the potential-to-ground of the positive terminal of the inverter; and a second converter unit configured to establish the potential-to-ground at the negative terminal of the solar cell as higher than the potential-to-ground at the negative terminal of the inverter; Given the aforementioned configuration, the above-described the converter prevents the potential-to-ground of the negative terminal in the solar cell from being negative and minimizes the decline in performance due to PID.

In the above-described converter, the first converter unit may include a first inductor with one end thereof connected to the positive terminal of the inverter; a first switching element configured for opening and closing the path between the positive terminal of the solar cell and the other end of the first inductor; and a first diode with the cathode connected to the other end of the first inductor and to the end of the first switching element on the inductor side, and the anode connected to the negative terminal of the solar cell; the second converter unit may include a second inductor with one end thereof connected to the negative terminal of the solar cell; a second switching element configured for opening and closing the path between positive terminal of the first converter unit and the positive terminal of the inverter, and the other end of the second inductor; and a second diode with the cathode connected to the other end of the second inductor and to the end of the second switching element on the inductor side, and the anode connected to the negative terminal of the inverter.

Given the aforementioned configuration, the above-described converter is capable of establishing the potential-to-ground of the negative terminal of the solar cell at 0 V or greater, preventing a decline in performance due to PID.

In the above-described converter, the first converter unit may include a first inductor with one end thereof connected to the positive terminal of the inverter; a first switching element configured for opening and closing the path between the positive terminal of the solar cell and the other end of the first inductor; and a first diode with the cathode connected to the other end of the first inductor and to the end of the first switching element on the inductor side, and the anode connected to the negative terminal of the inverter; the second converter unit may include a second inductor with one end thereof connected to the negative terminal of the solar cell; a second switching element configured for opening and closing the path between positive terminal of the solar cell and the other end of the second inductor; and a second diode with the cathode connected to the other end of the second inductor and to the end of the second switching element on the inductor side, and the anode connected to the negative terminal of the inverter.

Given the aforementioned configuration, the above-described converter is capable of establishing the potential-to-ground of the negative terminal of the solar cell at 0 V or greater, preventing the decline in performance due to PID.

The above-described converter may be configured as a unit separate from a power conditioner that includes the inverter, and is connected to the inverter via external terminals on the direct-current side of said power conditioner; and may be configured to establish the voltage between the positive terminal and negative terminal of the solar cell and the voltage applied between the positive external terminal and negative external terminal on the direct-current side of the power conditioner as the same voltage.

Given the aforementioned configuration, the above-described converter is capable of establishing the potential-to-ground of the negative terminal of the solar cell at 0 V or greater, preventing the decline in performance due to PID. The above-described converter establishes the voltage between the positive terminal and negative terminal of the solar cell and the voltage applied between the positive external terminal and negative external terminal on the direct-current side of the power conditioner as the same voltage; hereby, the converter may be connected between a solar cell in an existing solar power system and a power conditioner to prevent the decline of performance due to PID.

In the above-described converter, the first converter unit may include a first inductor with one end thereof connected to the positive terminal of the power conditioner; a first switching element configured for opening and closing the path between the positive terminal of the solar cell and the other end of the first inductor; and a first diode with the cathode connected to the other end of the first inductor and to the end of the first switching element on the inductor side, and the anode connected to the negative terminal of the solar cell; the second converter unit may include a second inductor with one end thereof connected to the negative terminal of the solar cell; a second switching element configured for opening and closing the path between positive terminal of the first converter unit and the positive external terminal on the direct-current side of the power conditioner, and the other end of the second inductor; and a second diode with the cathode connected to the other end of the second inductor and to the end of the second switching element on the inductor side, and the anode connected to the negative external terminal on the direct-current side of the power conditioner.

Given the aforementioned configuration, the above-described converter is capable of establishing the potential-to-ground of the negative terminal of the solar cell at 0 V or greater, preventing the decline in performance due to PID. The above-described converter establishes the voltage between the positive terminal and negative terminal of the solar cell and the voltage applied between the positive external terminal and negative external terminal on the direct-current side of the power conditioner as the same voltage; hereby, the converter may be connected between a solar cell in an existing solar power system and a power conditioner to prevent the decline of performance due to PID.

In the above-described converter, the first converter unit may include a first inductor with one end thereof connected to the positive external terminal on the direct-current side of the power conditioner; a first switching element configured for opening and closing the path between the positive terminal of the solar cell and the other end of the first inductor; and a first diode with the cathode connected to the other end of the first inductor and to the end of the first switching element on the inductor side, and the anode connected to the negative external terminal on the direct-current side of the power conditioner; the second converter unit may include a second inductor with one end thereof connected to the negative terminal of the solar cell; a second switching element configured for opening and closing the path between positive terminal of the solar cell and the other end of the second inductor; and a second diode with the cathode connected to the other end of the second inductor and to the end of the second switching element on the inductor side, and the anode connected to the negative external terminal on the direct-current side of the power conditioner.

Given the aforementioned configuration, the above-described converter is capable of establishing the potential-to-ground of the negative terminal of the solar cell at 0 V or greater, preventing the decline in performance due to PID. The above-described converter establishes the voltage between the positive terminal and negative terminal of the solar cell and the voltage applied between the positive external terminal and negative external terminal on the direct-current side of the power conditioner as the same voltage; hereby, the converter may be connected between a solar cell in an existing solar power system and a power conditioner to prevent the decline of performance due to PID.

The above-described converter may include an estimation unit configured to estimate the potential-to-ground at the negative terminal of the solar cell; and a control unit configured to actuate the switching elements on the basis of the potential-to-ground, so that the potential-to-ground at the negative terminal of the solar cell is 0 V or greater.

Given the aforementioned configuration, the converter modifies the potential-to-ground of the negative terminal in the solar cell to 0 V or greater in accordance with the fluctuation in the system voltage even when the potential-to-ground of the negative terminal in the solar cell is outside a predetermined value to precisely prevent deterioration in the performance of the solar cell due to PID.

The above-described converter may include an estimation unit configured to acquire information from the power conditioner indicating the system voltage of the power grid to which the power conditioner is connected or indicating the voltage between the positive and negative terminals of the inverter, and to estimate the potential-to-ground of the negative terminal of the solar cell from said information; and a control unit configured to actuate the switching elements on the basis of the potential-to-ground estimated by the estimation unit so that the potential-to-ground at the negative terminal of the solar cell is 0 V or greater.

Given the aforementioned configuration, the above-described converter maintains the potential-to-ground of the negative terminal in the solar cell at 0 V or greater to prevent the deterioration of performance due to PID even when the system voltage fluctuates.

The above-describe converter may include a measurement unit configured to measure a system voltage for a power grid to which the power conditioner is connected; an estimation unit configured to estimate the potential-to-ground at the negative terminal of the solar cell on the basis of the system voltage measured by the measurement unit; and a control unit configured to actuate the switching elements on the basis of the potential-to-ground estimated by the estimation unit so that the potential-to-ground at the negative terminal of the solar cell is 0 V or greater.

Given the aforementioned configuration, the above-described converter maintains the potential-to-ground of the negative terminal in the solar cell at 0 V or greater to prevent the deterioration of performance due to PID even when the system voltage fluctuates.

An example of a solar power system described herein is provided with the aforementioned converter, solar cell, and inverter. Given the aforementioned configuration the solar power system reduces the likelihood of a negative potential-to-ground at the negative terminal in the solar cell to prevent the deterioration in the performance of the solar cell due to PID.

Effects

Embodiments of the present invention minimize the decline in performance of the solar cell due to PID.

DETAILED DESCRIPTION

An embodiment (below, "the embodiment") according to an aspect of the invention is described below on the basis of the drawings.

1. Example Application

Figure 1A:
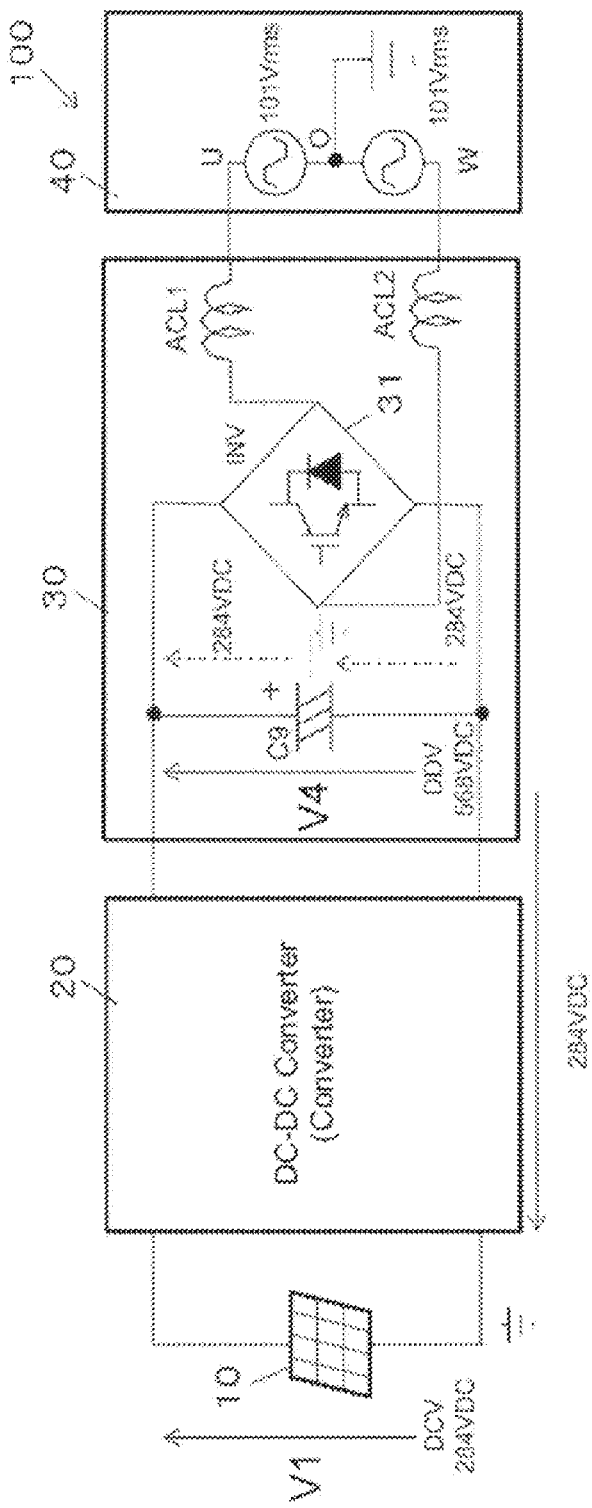
FIGS. 1A and 1B are for illustrating the configuration of a solar power system according to an embodiment.
Figure 2A:
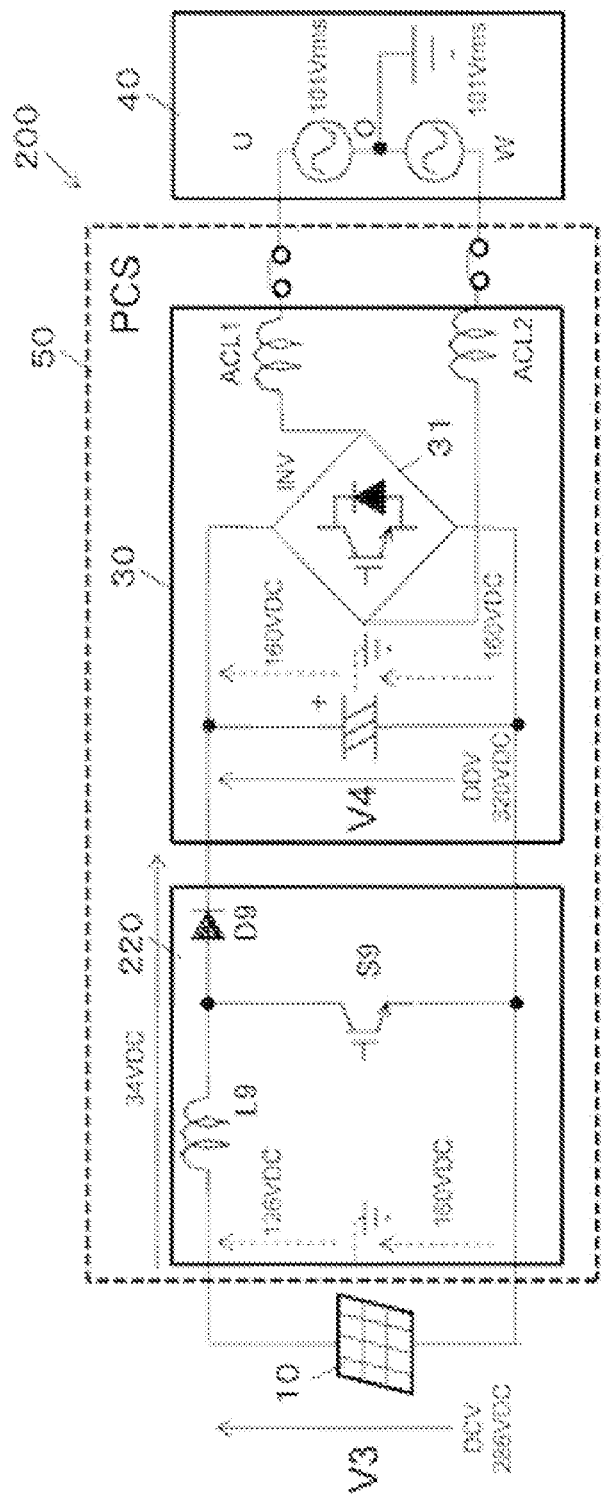
FIGS. 2A and 2B depict the circuit configuration of a solar power system provided with a DC-DC converter and an inverter unit as a comparative example.
Figure 3:
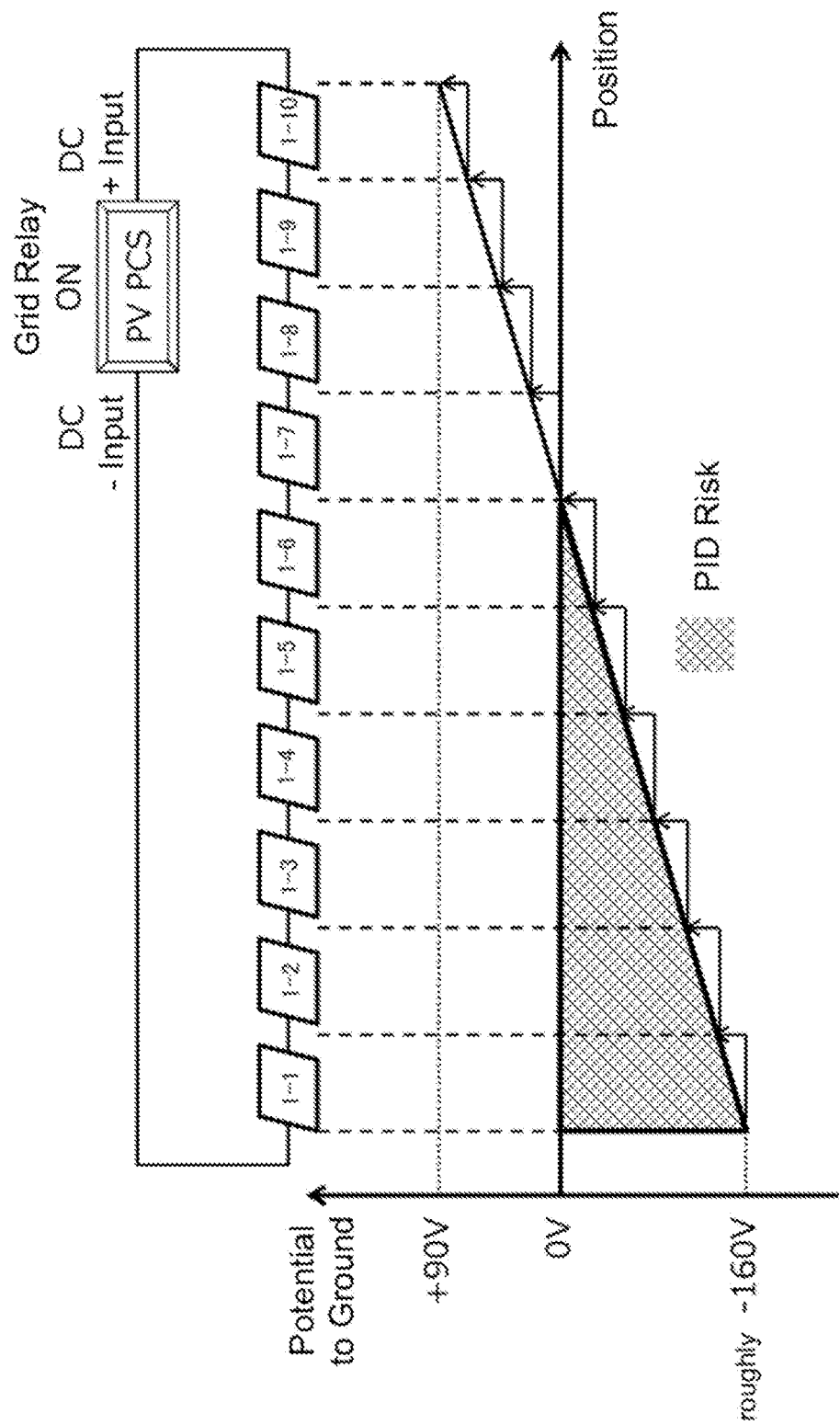
FIG. 3 depicts the potential-to-ground in the comparative example.

FIG. 1A is a block diagram illustrating a circuit configuration of a solar power system 100 according to an embodiment; FIG. 2A illustrates a solar power system 200 provided with a DC-DC converter 220 and an inverter unit 30 as a comparative example; and FIG. 3 depicts the potential-to-ground in the comparative example.

In the example illustrated in FIG. 1A the solar power system 100 is provided with a solar cell 10, a DC-DC converter 20, and an inverter unit 30; the solar power system 100 is connected to the commercial power grid or a load device via a distribution panel 40.

The solar power system 100 boosts the direct-current power generated by the solar cell 10 to a predetermined voltage with the DC-DC converter 20, converts to direct-current power to alternating-current power with the inverter unit 30 and supplies the alternating-current power to the commercial power grid or a load device.

Figure 16:
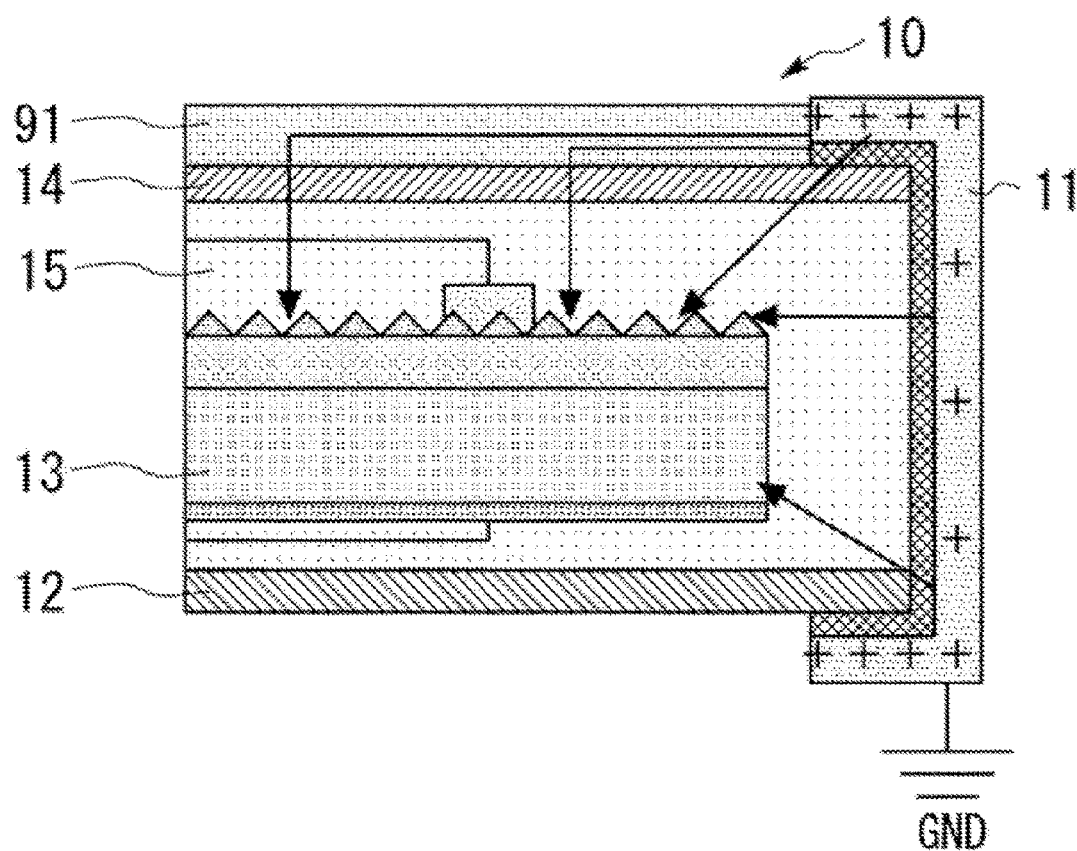
FIG. 16 schematically illustrates the structure of a solar cell module.

The solar cell 10 is equipped with a plurality of solar cells strings 1S connected in parallel; the solar cell string 1S is equipped with a plurality of solar cell modules 1 connected in series. Each of the solar cell modules 1 converts solar energy to electrical energy via the photovoltaic effect and outputs direct current power. The solar cell module 1 is a known configuration where a panel with a cell 13 sealed between a glass 14 and a backsheet 12 are held in a frame 11 as depicted in FIG. 16. While a cell 13 is schematically illustrated in FIG. 9, a solar cell module 1 may contain a plurality of cells 13 that are connected in series via an electrode pattern 16 with a plurality of the cells connected in series further connected in parallel. The cells 13 are connected to the output terminal of the solar cell module 1 (not shown), with the electricity generated from each cell 13 output to said output terminal. The frame 11 is grounded separately from the internal circuit tree of the cells 13; and, there exists a potential difference (potential-to-ground) between the cell 13 and the frame 11.

The DC-DC converter 20 converts the output from the solar cell 10 and applies the converted output to the inverter unit 30.

The inverter unit 30 converts the direct-current power entering from the DC-DC converter 20 into alternating-current power and supplies the alternating-current power to a commercial power grid or a load device. The inverter unit 30 may be provided with a grid connection relay or the like and manages grid connection, i.e., connection to and disconnection from a commercial power grid.

In the example illustrated in FIG. 2A the solar power system 100 is provided with a solar cell 10, a DC-DC converter 220, and an inverter unit 30; the solar power system 100 is connected to the commercial power grid or a load device via a distribution panel 40.

The DC-DC converter 220 is a non-insulated boost circuit that includes an inductor L9, a boosting switching element S9, and a diode D9. One end of the inductor L9 is connected to the positive terminal of the solar cell 10 and the other terminal is connected to the anode of the diode D9 and the high-potential end of the switching element S9. The anode of the diode D9 is connected to the inductor L9 and the high-potential end of the switching element S9; the cathode of the diode D9 is connected to the positive terminal on the output side of the DC-DC converter 220. The switching element S9 is connected in parallel with the solar cell 10; the low-potential end of the switching element S9 is connected to the negative terminal of the solar cell 10 and the negative terminal at the output side of the DC-DC converter 220.

Figure 2B:
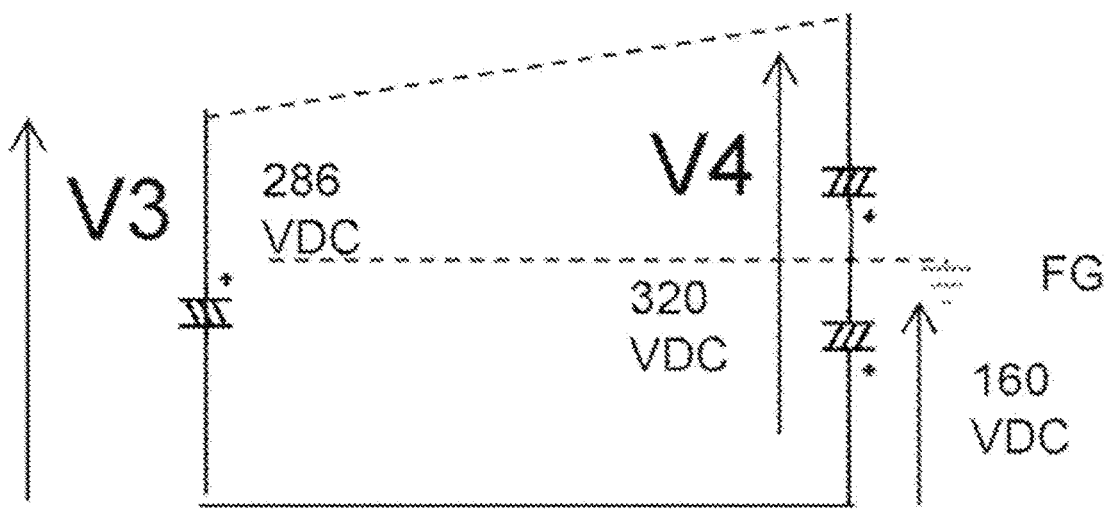

In the comparative example of a solar power system 200, the inductor L9 and the diode D9 are connected to the positive terminal side of the DC-DC converter while the negative terminal side of the DC-DC converter 220 serves as the common; i.e., the negative terminal is connected to the negative terminal of the solar cell 10 and the negative terminal of the inverter unit 30. Hereby, the potential-to-ground of the negative terminal in the solar cell 10 is the same as the potential-to-ground at the negative terminal of the inverter unit 30. Therefore, as illustrated in for example FIG. 2B when the voltage across the positive and negative terminals on the direct-current side of the inverter unit 30 is 320V, the potential at the negative terminal of the solar cell 10 is −160V when the potential at the negative terminal of the inverter unit is −160 V. When the solar cell 10 generates electrical energy and the voltage across the positive terminal and negative terminal is 284 V, the potential (potential-to-ground) between the positive terminal and negative terminal is +124 V. At this point, when the solar cells string 1S in the solar cell 10 is structured from solar cell modules 1-1 through 1-10 is illustrated in FIG. 3 for example, the solar cell modules 1-1 through 1-6 on the negative terminal sides (shown as hatched in FIG. 3) have a negative potential-to-ground and creates the risk of a decline in performance due to PID.

Figure 1B:
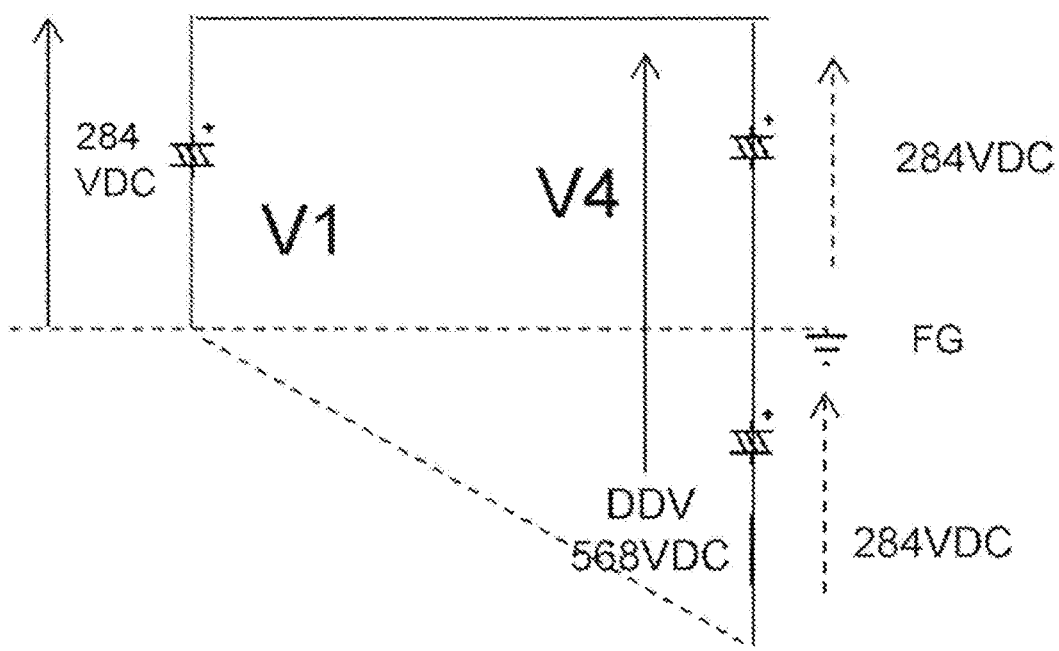

Therefore, the DC-DC converter 20 in the solar power system 100 is configured so that the negative terminal of the solar cell 10 and the negative terminal of the inverter 31 are not common so that when the direct current voltage generated by the solar cell to the inverter side is output the potential-to-ground at the negative terminal of the solar cell 10 is higher than the potential-to-ground of the negative terminal of the inverter 31. The potential-to-ground of the solar cell module 1 located closer to the negative terminal of the solar cell 10 is inhibited from becoming negative and thus minimizes the deterioration of performance of the solar cell 10 due to PID. The potential-to-ground at the negative terminal of the solar cell 10 may be established at 0 V to prevent a deterioration in the performance of the solar cell due to PID. In the example illustrated in FIG. 1B, the DC-DC converter 20 boosts the output voltage V1 of the solar cell (e.g., to 284 V) and applies the same across the positive and negative terminals of the inverter unit 30; the voltage V4 across the positive and negative terminals of the inverter unit 30 is 568 V, in other words is the voltage across the positive and negative terminal of the inverter 31. Here, the potential-to-ground at the positive terminal is +284 V and the potential-to-ground at the negative terminal is −284 V because the potential-to-ground at the midpoint across the positive terminal and negative terminal of the inverter unit 30 is 0 V. The DC-DC converter 20 establishes the same potential-to-ground with the positive terminal of the solar cell 10 and the positive terminal of the inverter unit 30 as common, so the potential-to-ground at the positive terminal of the solar cell can be assumed to be +284V. Therefore, the potential-to-ground at the negative terminal is 0 V when the voltage across the positive terminal and negative terminal of the solar cell 10 is 284 V, thus preventing a deterioration in the performance of the solar cell 10 due to PID. Note that the DC-DC converter 20 is one example of the converter of the present invention.

2. Example Configuration (2.1)

Figure 4A:
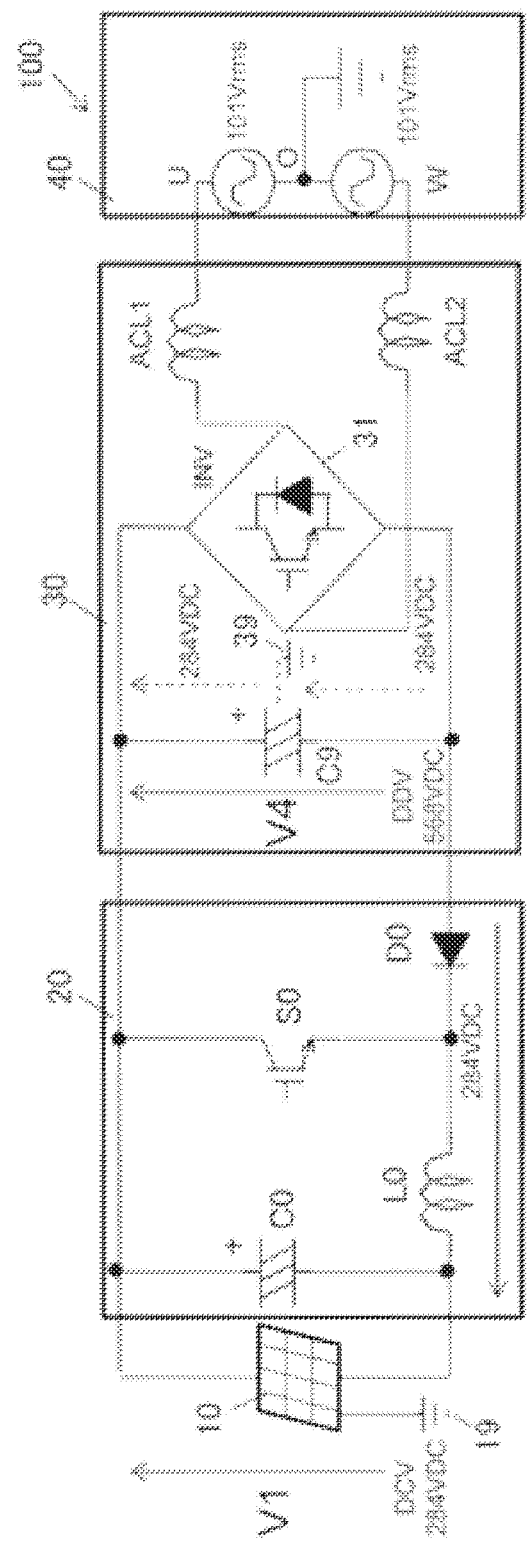
FIGS. 4A and 4B illustrate an example of a circuit configuration (2.1) of a DC-DC converter and an inverter unit that may be provided to a solar power system.

FIG. 4A illustrates an example of a circuit configuration (2.1) of a DC-DC converter 20 and an inverter unit 30 that may be provided to a solar power system 100; The components having the same function as in the previous explanation for FIG. 1A are given the same reference numerals and a repeated description therefor is omitted.

In the example illustrated in FIG. 4A, the DC-DC converter 20 connected to the solar cell 10 is a non-insulated boost circuit that includes an inductor L0, a boosting switching element S0, a diode D0, and a capacitor C0.

One end of the inductor L0 is connected to the negative terminal of the solar cell 10 and the other terminal is connected to the cathode of the diode D0 and the low-potential end of the switching element S0.

The cathode of the diode D0 is connected to the inductor L0 and the low-potential end of the switching element S0 while the anode is connected to the negative terminal at the output end of the DC-DC converter 20. That is, the inductor L0 and the diode D0 are connected in series to a line on the negative terminal side of the DC-DC converter 20.

The high-potential end of the switching element S0 is connected to the positive terminal of the solar cell 10 and the positive terminal of the inverter 31 while the low-potential end is connected to the cathode of the diode D0 and the end of the inductor L0 on the inverter 31 side.

The switching element S0 may be a mental-oxide-semiconductor (MOS)type field effect transistor, and insulated gate bipolar transistor (IGBT) the like. The switching element S0 operates by way of a drive circuit (not shown) to periodically set the high-potential end (the drain in this example) and the low-potential end (the source in this example) to on and off.

The capacitor C0 is connected in parallel between the solar cell 10 on the input-side positive and negative terminal of the DC-DC converter 20; the capacitor C0 smoothes the output from the DC-DC converter 20 via the switching operation of the switching element S0.

The switching operation of the switching element S0 allows the DC-DC converter 20 to boost the direct-current voltage input from the solar cell 10 (e.g., 284 V) to a predetermined voltage (e.g., 564 V) and output the same to the inverter unit 30.

The inverter unit 30 includes a capacitor C9, and inverter 31, and AC inductors ACL1, ACL2.

The capacitor C9 is connected to the positive and negative terminal on the direct-current side of the inverter unit 30 and serves as a filter circuit that smoothes the noise component of the direct current voltage entering the DC-DC converter 20.

The inverter 31 converts the direct-current power from the solar cell 10 into alternating current power, and outputs the alternating current power via the AC inductor ACL1, ACL2.

Figure 4B:
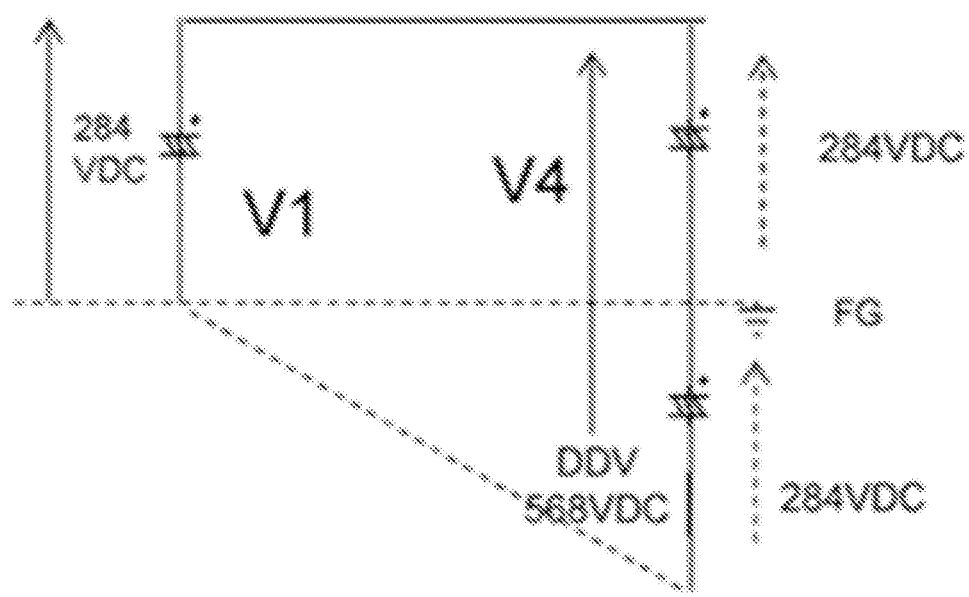

In the example in FIG. 4B, the DC-DC converter 20 boosts the voltage V1 across the positive and negative terminals of the solar cell 10 (e.g., 284 V) and applies the boosted voltage across the positive and negative terminals of the inverter unit 30 to create a voltage V4 of 568 V across the positive and negative terminals of the inverter unit 30. Here, the potential-to-ground at the positive terminal is +284 V on the potential-to-ground at the negative terminal is −284 V because the potential-to-ground at the center across the positive and negative terminals of the inverter unit 30 is 0 V. The DC-DC converter 20 establishes the same potential-to-ground with the positive terminal of the solar cell 10 and the positive terminal of the inverter unit 30 as common, so the potential-to-ground at the positive terminal of the solar cell can be assumed to be +284V. Therefore, the potential-to-ground at the negative terminal is 0 V when the voltage across the positive terminal and negative terminal of the solar cell 10 is 284 V, thus preventing a deterioration in the performance of the solar cell 10 due to PID. While in this example the potential-to-ground at the negative terminal in the solar cell 10 is 0V, a potential-to-ground greater than 0 V may be established when adopting a polycrystalline silicon solar cell. Note that establishing a potential-to-ground at the negative terminal of 0 V is preferable in the solar cell when adopting a thin-film silicon solar cell since the thin film peels off the potential-to-ground at the negative terminal in the solar cell 10 is excessively high. However, the potential-to-ground in this particular case is not strictly limited to 0 V, and may be less than 0 V to the extent that PID does not occur, or may exceed 0 V to the extent that the thin film does not peel.

(2.2)

Figure 5A:
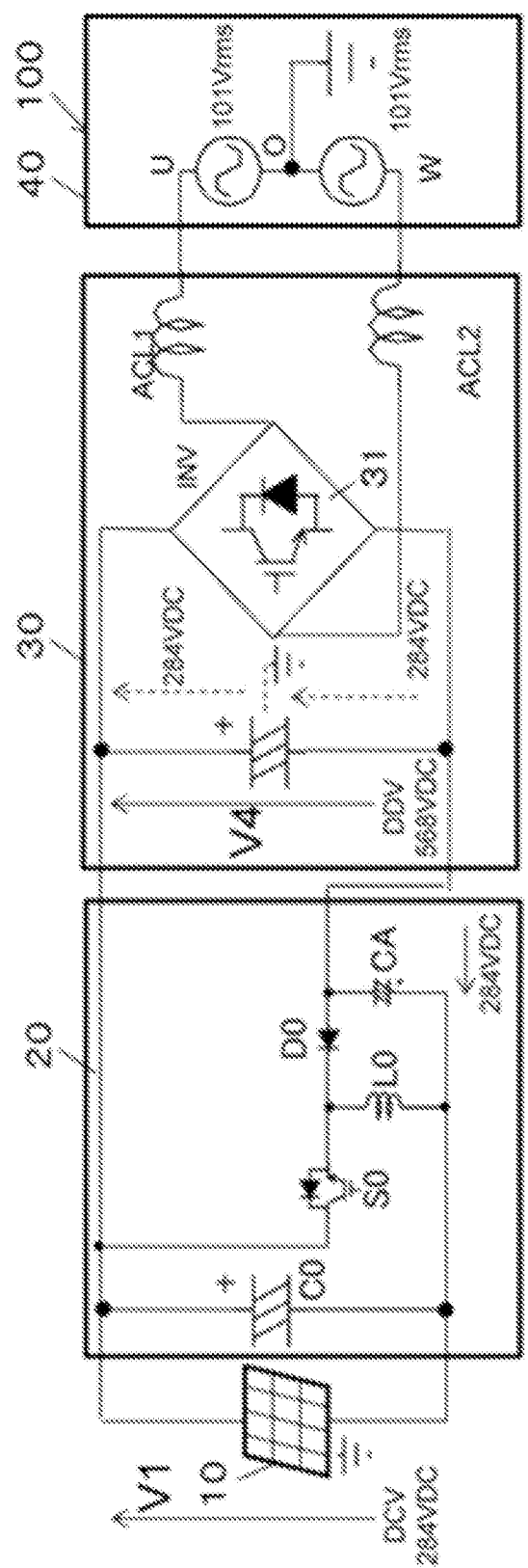
FIGS. 5A and 5B illustrate an example of a circuit configuration (2.2) of a DC-DC converter and an inverter unit that may be provided to a solar power system.

FIG. 5A illustrates an example of a circuit configuration of a DC-DC converter 20 and an inverter unit 30 that may be provided to a solar power system 100; note that the components having the same function as in the solar power system 100 in FIG. 4A are given the same reference numerals and a repeated description therefor is omitted.

In the example in FIG. 5A, a capacitor CA is provided to the DC-DC converter 20; one end of the capacitor CA is connected to the end of the inductor L0 on the solar cell side, while the other end is connected to the anode of the diode D0 and the negative terminal of the inverter unit 30.

Figure 5B:
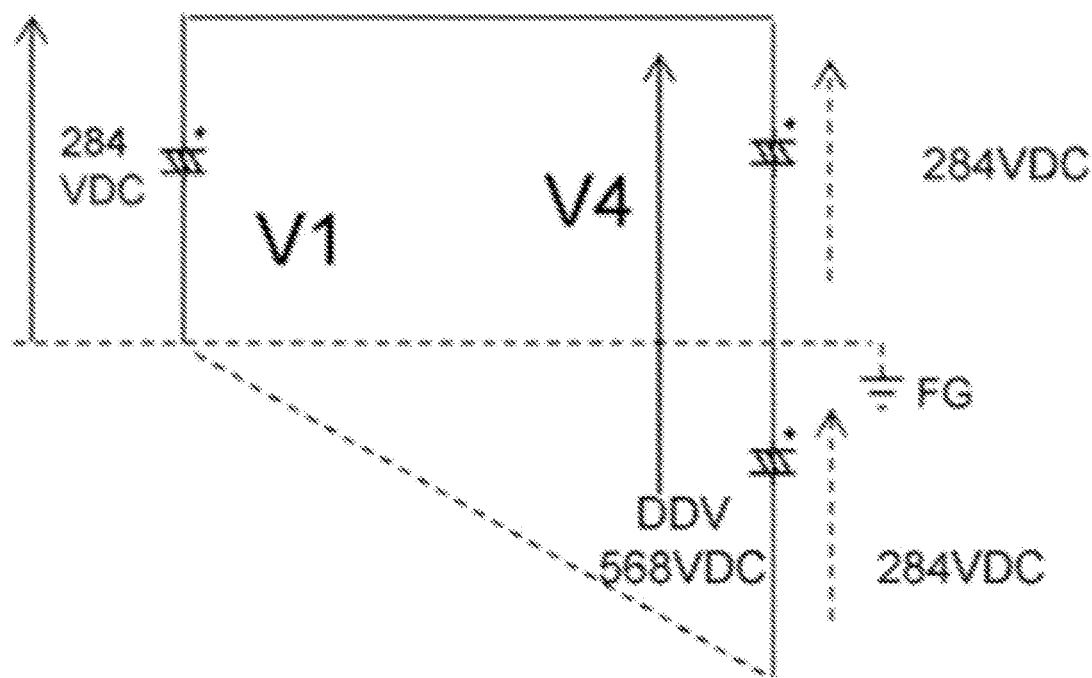

The potential-to-ground at the negative terminal in the solar cell 10 is 0 V as illustrated in FIG. 5B in the solar power system 100 in FIG. 5A and in this system PID is prevented from causing the performance of the solar cell 10. To deteriorate.

(2.3)

Figure 6A:
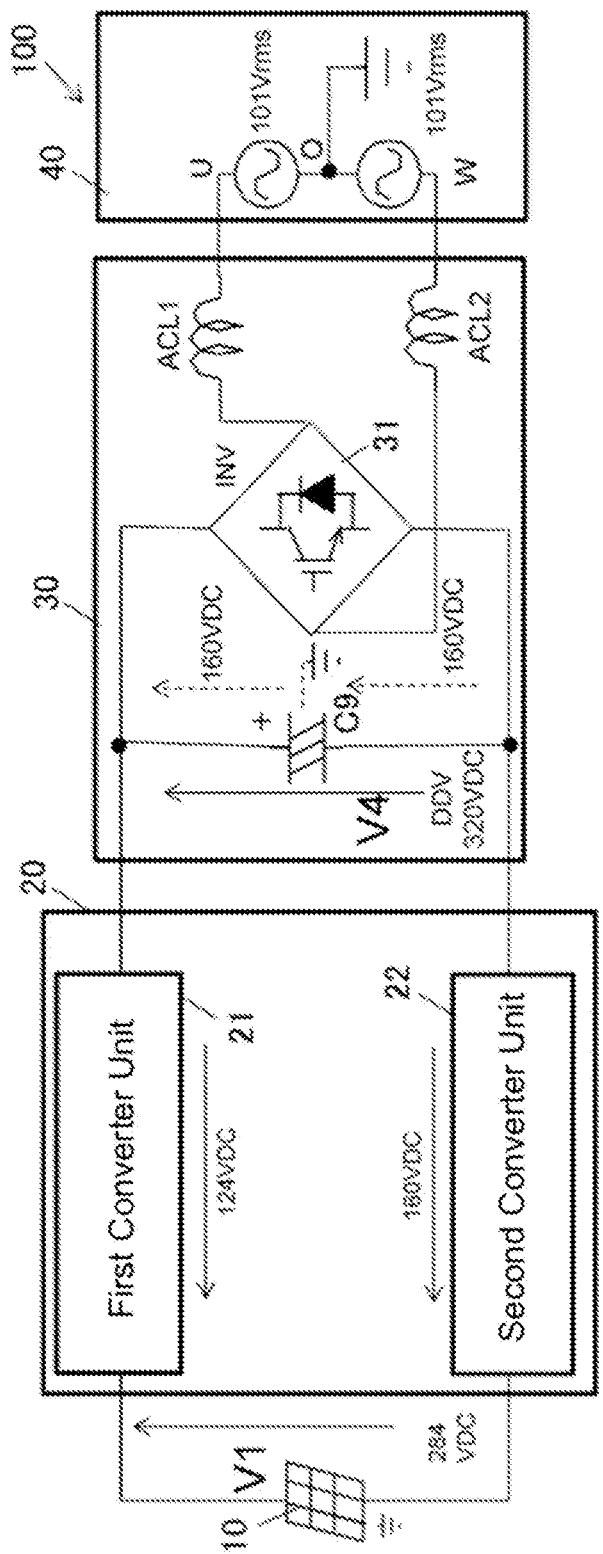
FIGS. 6A and 6B illustrate an example of a circuit configuration (2.3) of a DC-DC converter and an inverter unit that may be provided to a solar power system.

FIG. 6A illustrates an example of a circuit configuration of a DC-DC converter 20 and an inverter unit 30 that may be provided to a solar power system 100; note that the components having the same function as in the solar power system 100 are given the same reference numerals and a repeated description therefor is omitted.

Figure 6B:
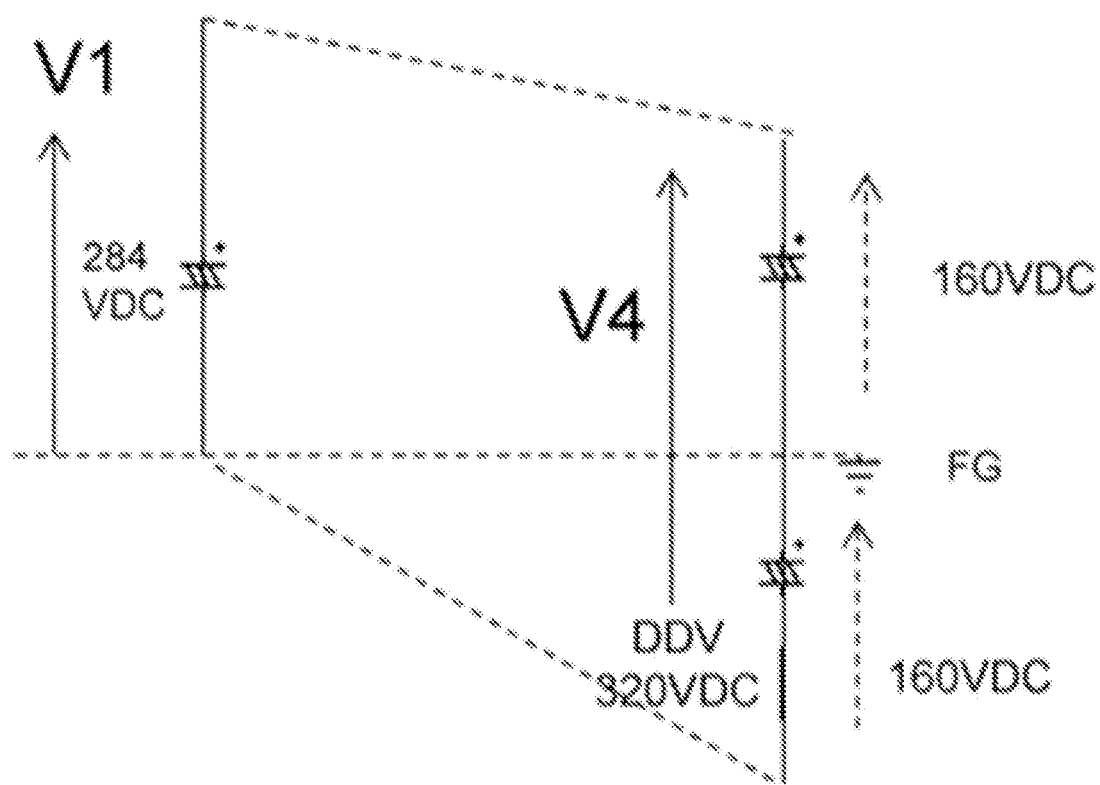

In the example in FIG. 6A, the DC-DC converter 20 is provided with a first converter unit 21 and a second converter unit 22. The first converter unit 21 establishes the potential-to-ground of the positive terminal in the solar cell 10 as greater than or equal to the potential-to-ground of the positive terminal in the inverter 31. The second converter unit 22 increases the potential-to-ground of the negative terminal in the solar cell 10 to greater than the potential-to-ground of the negative terminal in the inverter 31. In the example illustrated in FIG. 6B, the potential-to-ground of the negative terminal in the solar cell 10 is set to 0 V. With this configuration, the solar power system 100 in FIG. 6A prevents deterioration of the performance of the solar cell 10 due to PID.

In the solar power system 100 in FIG. 4A, the potential-to-ground of the positive terminal in the solar cell 10 is identical to the potential-to-ground of the positive terminal in the inverter 31; therefore, in order to establish the potential-to-ground of the negative terminal in the solar cell 10 as 0 V, the voltage V4 between the positive and negative terminals in the inverter 31 must be increased to two or more times the voltage V1 between the positive and negative terminals in the solar cell 10. In contrast, in the solar power system 100 in FIG. 6A, the potential-to-ground of the positive terminal in the solar cell 10 is greater than the potential-to-ground of the positive terminal in the inverter 31; therefore, there is no need to establish the voltage V4 between the positive and negative terminals in the inverter 31 to two times the voltage V1 between the positive and negative terminals in the solar cell 10, thus increasing the flexibility in design.

(2.3.1)

Figure 7A:
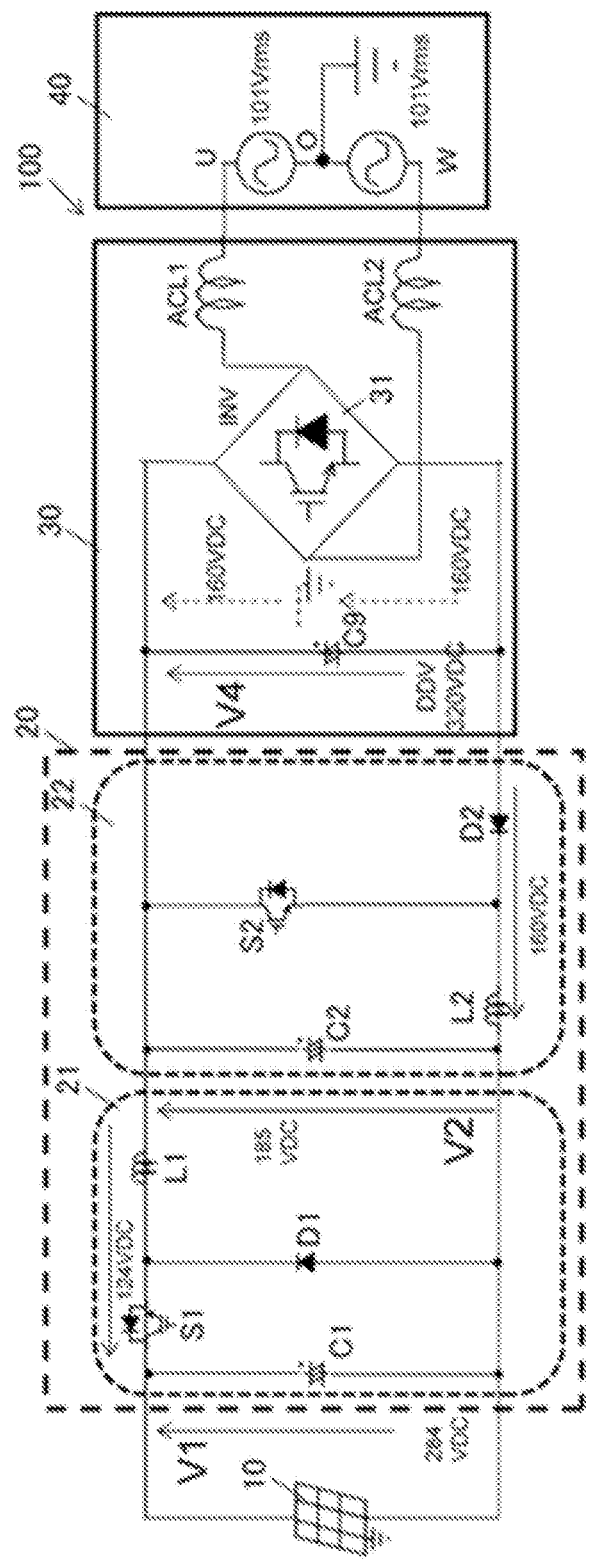
FIGS. 7A and 7B illustrate an example of a circuit configuration (2.3.1) of a DC-DC converter and an inverter unit that may be provided to a solar power system.

FIG. 7A illustrates an example of a circuit configuration of a DC-DC converter 20 and an inverter unit 30 that may be provided to a solar power system 100; note that the components having the same function as in the solar power system 100 are given the same reference numerals and a repeated description therefor is omitted.

In the example illustrated in FIG. 7A, the first converter unit 21 is a non-isolated chop circuit that includes a first inductor L1, a first switching element S1, a first diode D1, and a first capacitor C1.

One end of the inductor L1 is connected to the positive terminal of the inverter 31, and the other end is connected to the cathode of the diode D1 and the end of the first switching element S1 on the inverter side.

The cathode of the first diode D1 is connected to the inductor L1 and the end of the first switching element S1 on the inverter side, while the anode is connected to the negative terminal of the solar cell 10.

One end of the first switching element S1 (e.g., the drain) is connected to the positive terminal of the solar cell 10 and the other end (e.g., the source) is connected to the cathode of the first diode D1 and the end of the first inductor L1 on the solar cell side.

The capacitor C1 is connected between the positive and negative terminals on the input side of the first converter unit 21 in parallel with the solar cell 10; the capacitor C1 smoothes the chopped output of the first converter unit 21 in accordance with a switching operation.

The second converter unit 22 is a non-isolated boost circuit that includes a second inductor L2, a second switching element S2, a second diode D2, and a capacitor C2.

One end of the second inductor L2 is connected to the negative terminal of the solar cell 10 and the other end is connected to the cathode of the second diode D2 and the end of the second switching element S2 on the low-potential side.

The cathode of the second diode D2 is connected to the second inductor L2 and the end of the second switching element S2 on the low-potential side, while the anode is connected to the negative terminal at the output end of the DC-DC converter 20. That is, the second inductor L2 and the second diode D2 are connected in series on the line on the negative terminal side of the DC-DC converter 20.

The high-potential end of the second switching element S2 is connected to the positive terminal of the first converter unit 21 on the positive terminal of the inverter 31 while the low-potential end is connected to the cathode of the second diode D2 and the end of the second inductor L2 on the inverter 31 side.

The second capacitor C2 is connected between the positive and negative terminals of the second converter unit 22 on the solar cell side; that is, one end of the capacitor C2 is connected to the end of the second switching element S2 on the positive terminal side, while the other end is connected to the end of the second inductor L2 on the solar cell side; the capacitor C2 smoothes the boosted output of the second converter unit 22 according to a switching operation.

Figure 7B:
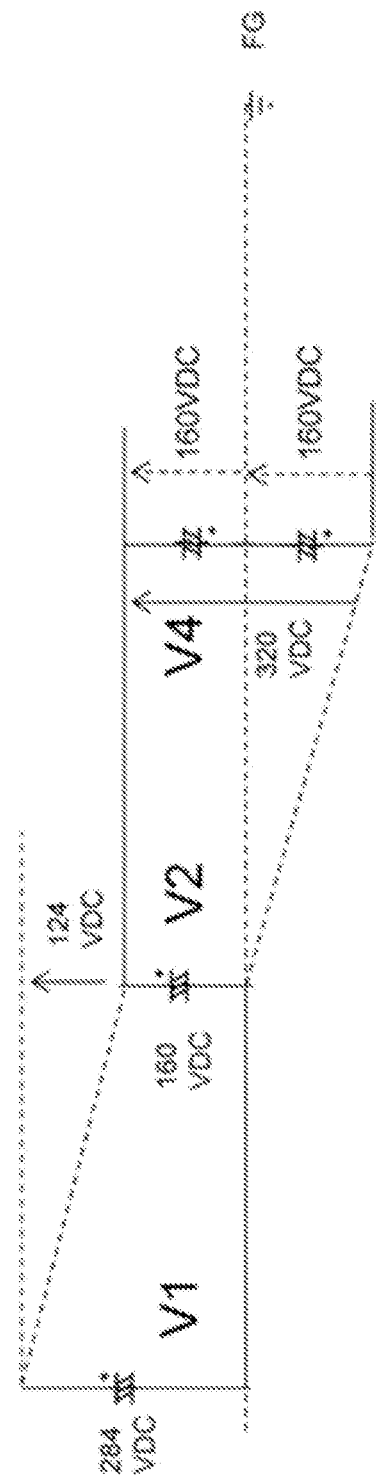

As illustrated in FIG. 7B, in the DC-DC converter 20 in this example, the first converter unit 21 chops the output voltage V1 of the solar cell 10 (e.g., 284 V) to a predetermined voltage V2 with the negative terminal as the common. The second converter unit 22 boosts the voltage V2 to two times the voltage V4 (e.g., 320 V) with the positive terminal as common. Hereby, the solar power system 100 in this example establishes the potential-to-ground of the negative terminal in the solar cell 10 to 0 V, and prevents deterioration in the performance of the solar cell 10 due to PID.

(2.3.2)

Figure 8A:
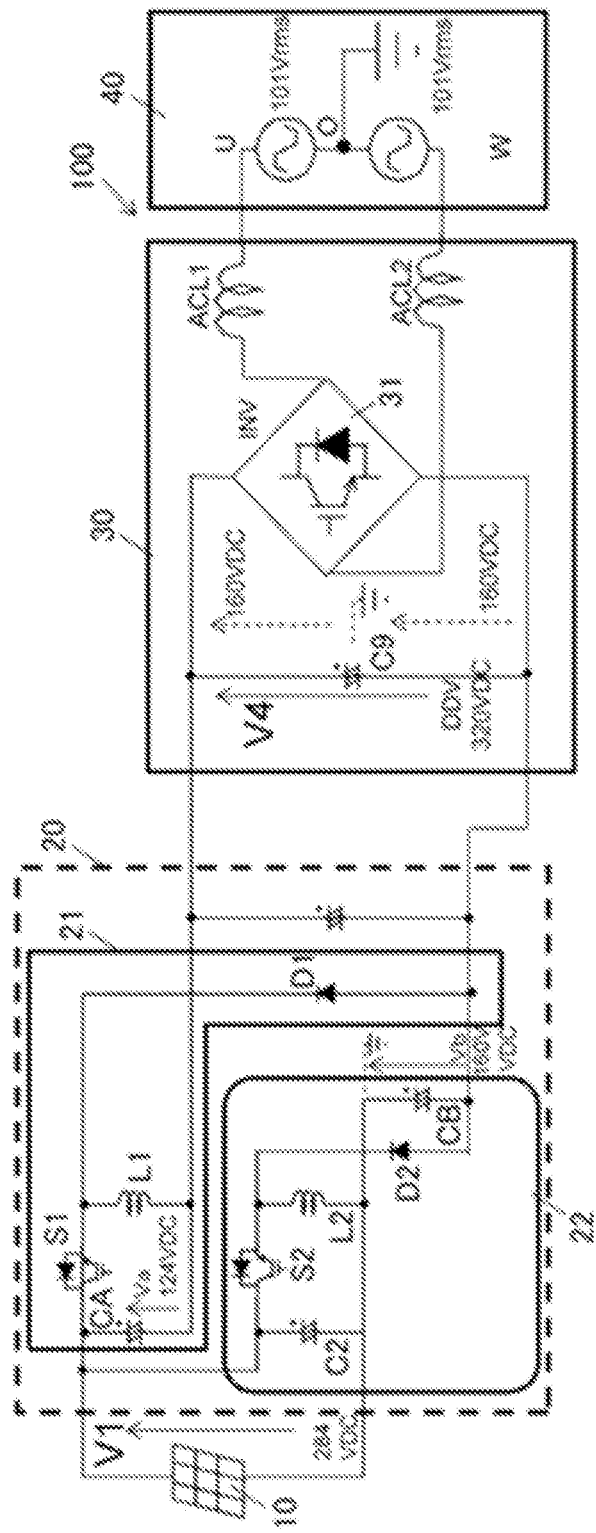
FIGS. 8A and 8B illustrate an example of a circuit configuration (2.3.2) of a DC-DC converter and an inverter unit that may be provided to a solar power system.

FIG. 8A illustrates an example of a circuit configuration of a DC-DC converter 20 and an inverter unit 30 that may be provided to a solar power system 100; note that the components having the same function as in the solar power system 100 are given the same reference numerals and a repeated description therefor is omitted.

In the example illustrated in FIG. 8A, the first converter unit 21 is a non-isolated circuit that includes a first inductor L1, a first switching element S1, a first diode D1, and a capacitor CA.

One end of the inductor L1 is connected to the positive terminal of the inverter 31, and the other end is connected to the cathode of the diode D1 and the end of the first switching element S1 on the inverter side.

The cathode of the first diode D1 is connected to the first inductor L1 on one end of the first switching element S1 on the inverter side, while the anode is connected to the negative terminal at the output end of the DC-DC converter 20; that is, the anode is connected to the negative terminal of the inverter 31.

One end of the first switching element S1 (e.g., the drain) is connected to the positive terminal of the solar cell 10 and the other end (e.g., the source) is connected to the cathode of the first diode D1 and the end of the first inductor L1 on the solar cell side.

One end of the capacitor CA is connected to the positive terminal of the solar cell 10 and to the end of the first switching element S1 on the solar cell side, while the other end is connected to the positive terminal of the inverter 31 and the end of the first inductor L1 on the inverter side.

The second converter unit 22 is a non-isolated circuit that includes a second inductor L2, a second switching element S2, a second diode D2, and a capacitor CB.

One end of the second inductor L2 is connected to the negative terminal of the solar cell 10 and the other end is connected to the cathode of the second diode D2 and the end of the second switching element S2 on the low-potential side.

The cathode of the second diode D2 is connected to the second inductor L2 and the low-potential end of the second switching element S2, while the anode is connected to the negative terminal of the inverter 31.

One end of the second switching element S2 on the high-potential side (e.g., the drain) is connected to the positive terminal of the solar cell 10 and the positive terminal of the first converter unit 21; the end on the low-potential side (e.g., the source) is connected to the cathode of the second diode D2 on one end of the second inductor L2.

One end of the capacitor CB is connected to the negative terminal of the solar cell 10 and the second inductor L2; the other end is connected to the negative terminal of the inverter 31 and the anode of the second diode D2.

Figure 8B:
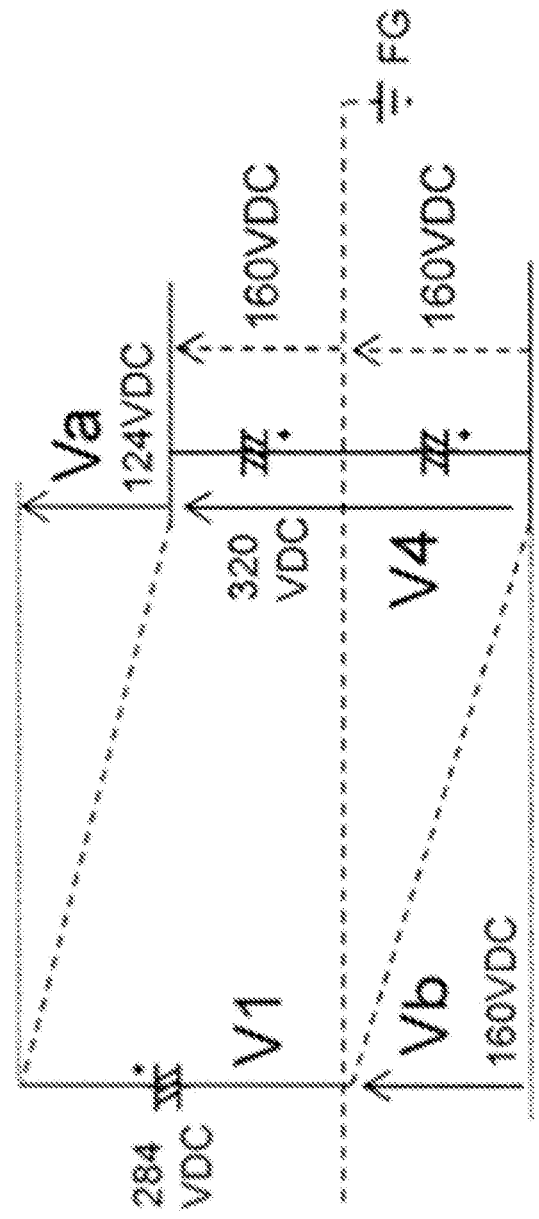

As illustrated in FIG. 8B, the solar power system 100 in this example is such that the potential-to-ground at the midpoint between the positive and negative terminals of the inverter units 30 is 0 V; therefore, the potential-to-ground of the positive terminal is +160 V and the potential-to-ground of the negative terminal is −160 V. The voltage Va across the capacitor CA is established at 124 V in the first converter unit 21 with the positive terminal of the inverter unit 30 as common; therefore, with ground as a reference, the potential at the positive terminal of the solar cell 10 equals the potential at the positive terminal of the inverter unit 30 (+160 V) added to the voltage Va (124 V) and is +284 V. In addition, the voltage Vb across the capacitor CB is established at 160 V in the second converter unit 22 with the negative terminal of the solar cell 10 as common; therefore, with ground as a reference, the potential at the negative terminal of the solar cell 10 equals the potential at the negative terminal of the inverter circuit 30 (−160 V) added to the voltage Vb (160 V) and is 0 V. The solar power system 100 thus prevents deterioration of the performance of the solar cell 10 due to PID.

(2.4)

Figure 9A:
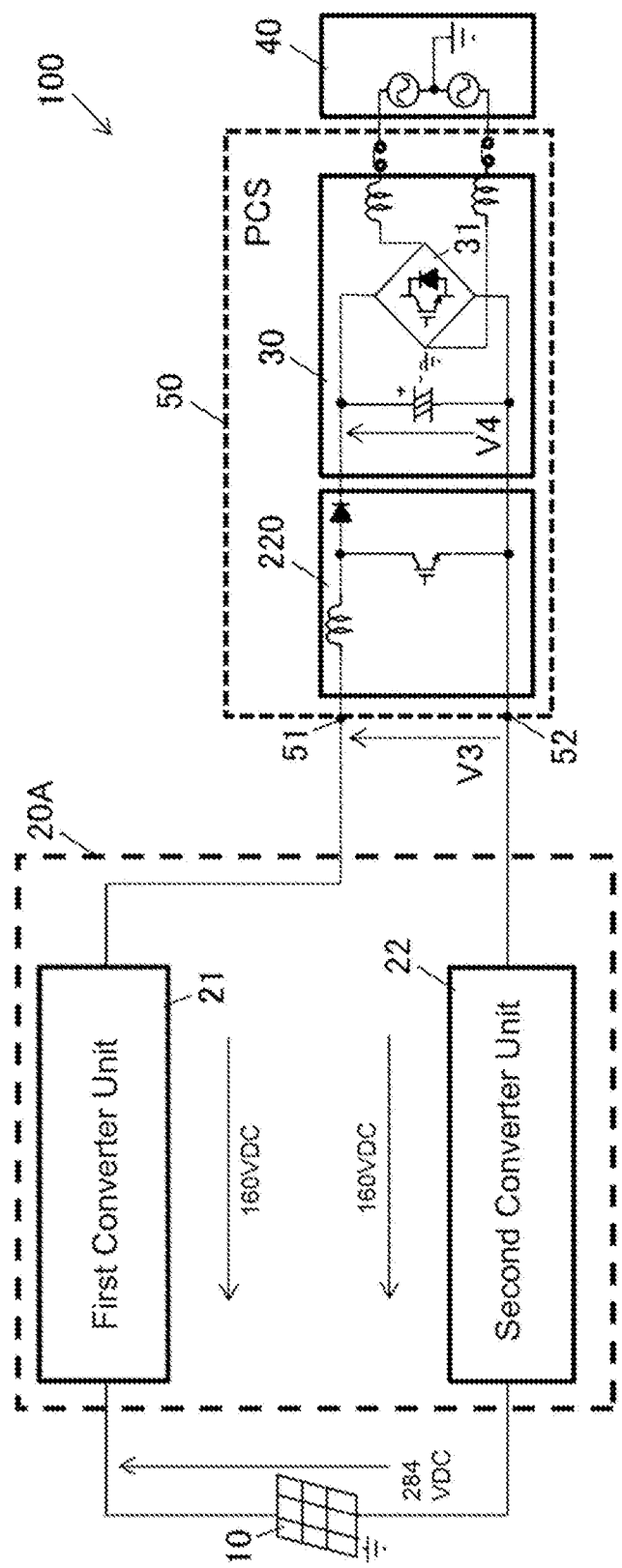
FIGS. 9A and 9B illustrate an example (2.4) of a solar power system.
Figure 9B:
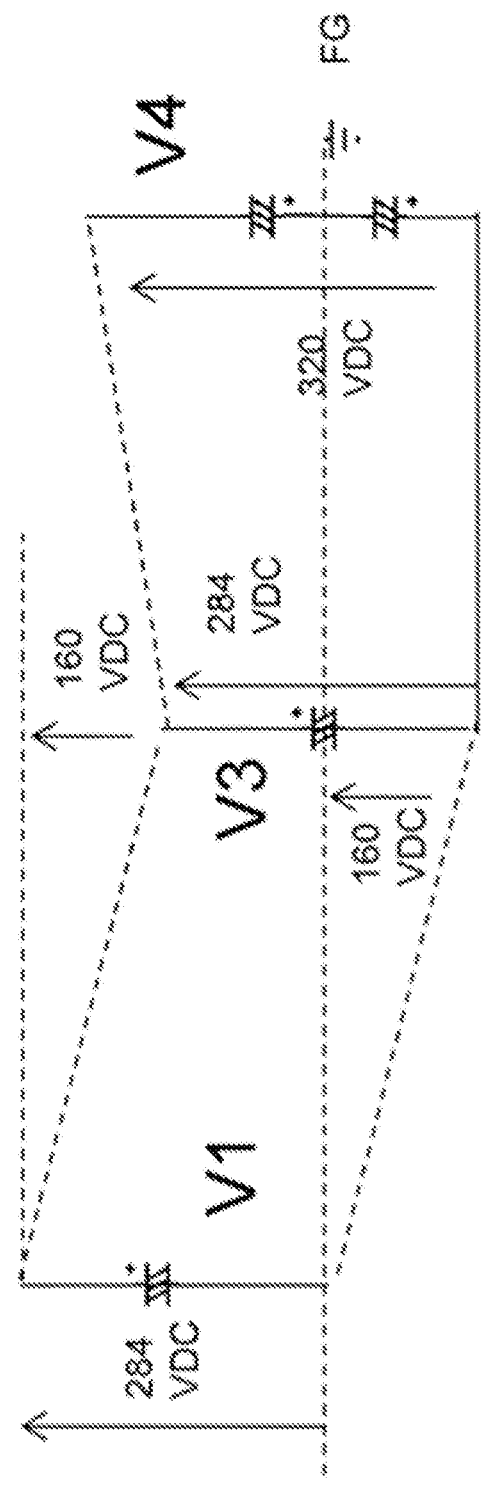

FIG. 9A illustrates an example of a solar power system 100; in this example, the solar power system 100 includes a converter 20A and a power conditioner 50 (also referred to below as a power conditioning system). The circuit configuration of the DC-DC converter 20 of FIG. 6A and the converter 20A of this example are identical; however, the parameters for converting the direct-current voltage are different. The PCS 50 in this example has the same configuration as the PCS in FIG. 2A. In this example the components having the same function as in the previously described solar power system 100 are given the same reference numerals and a repeated description therefor is omitted.

In the example in FIG. 9A, the converter 20A is provided with a first converter unit 21 and a second converter unit 22. The first converter unit 21 establishes the potential-to-ground of the positive terminal in the solar cell 10 as greater than or equal to the potential-to-ground of the positive terminal in the power conditioner 50. The second converter unit 22 increases the potential-to-ground of the negative terminal in the solar cell 10 to greater than the potential-to-ground of the negative terminal in the power conditioner 50. In the example illustrated in FIG. 9B, the potential-to-ground of the negative terminal in the solar cell 10 is set to 0 V. With this configuration the solar power system 100 in FIG. 9A prevents deterioration of the performance of the solar cell 10 due to PID.

The converter 20A in this example is configured as a device separate from the PCS 50 with the power output from the converter 20A supplied to the external terminals 51, 52 on the direct-current side of the PCS 50. The converter 20A ensures that the output voltage V1 of the solar cell 10 and the output voltage V3 applied to the external terminals 51, 52 on the direct-current side is the same. As an example, assume that when the PCS 50 converts the output voltage V1 from a solar cell 10 and the supplies the output to a commercial power grid or a load as illustrated the above FIG. 2A, a solar cell 10 in a solar power system 200 is about to suffer a deterioration in performance due to PID. As a separate device, the converter 20A can be connected between the solar cell 10 and the PCS 50 to adjust the potential-to-ground between the positive terminal and the negative terminal of the solar cell 10 and prevent a deterioration in the performance of the cell due to PID. That is, it is possible to facilitate preventing a deterioration in the performance of a solar cell 10 due to PID by simply adding the converter 20A to an existing solar power system.

(2.4.1)

Figure 10A:
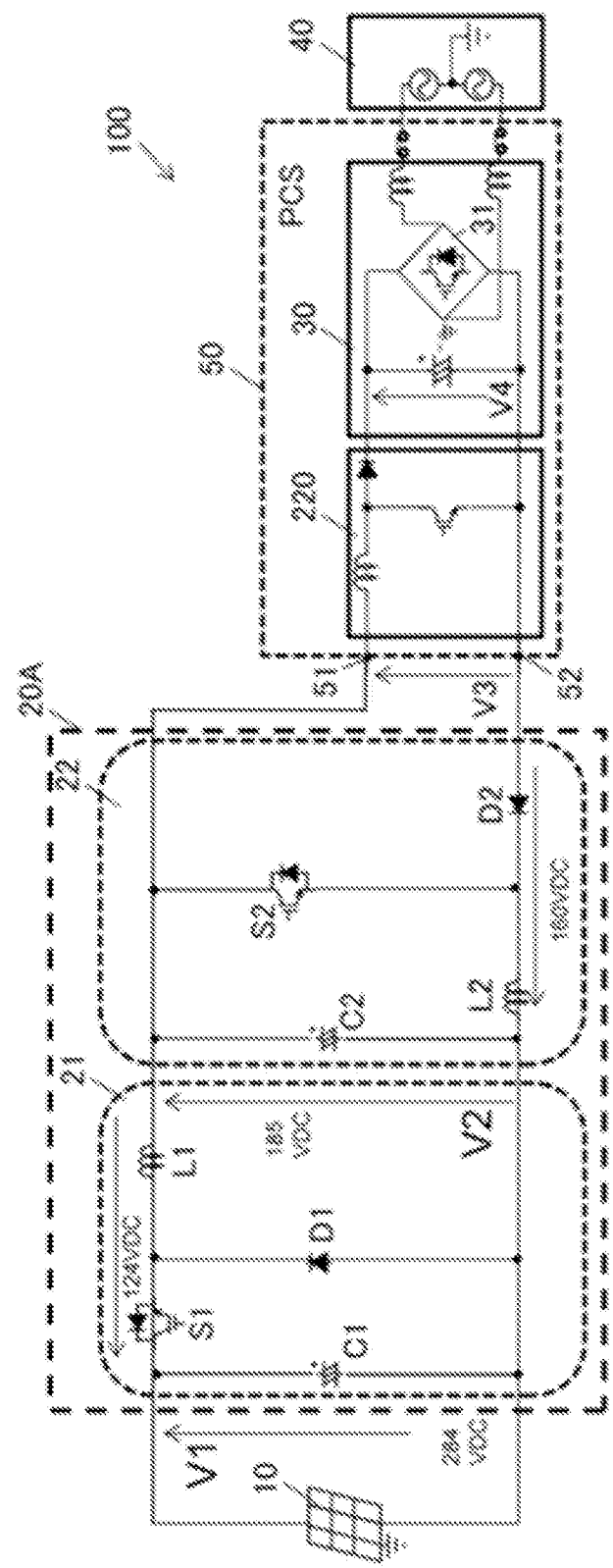
FIGS. 10A and 10B illustrate an example of a circuit configuration (2.4.1) of a converter and a power conditioner that may be provided to a solar power system.

FIG. 10A illustrates an example of a circuit configuration of a converter 20A and a PCS 50 that may be provided to a solar power system 100; the circuit configuration of the DC-DC converter 20 of FIG. 7A and the converter 20A of this example are identical; however, the parameters for converting the direct-current voltage are different. In the example in FIG. 7A the DC-DC converter 20 is connected to the inverter unit 30, while in this example the converter 20A is connected to the PCS 50. In this example the components having the same function as in the previously described solar power system 100 are given the same reference numerals and a repeated description therefor is omitted.

Figure 10B:
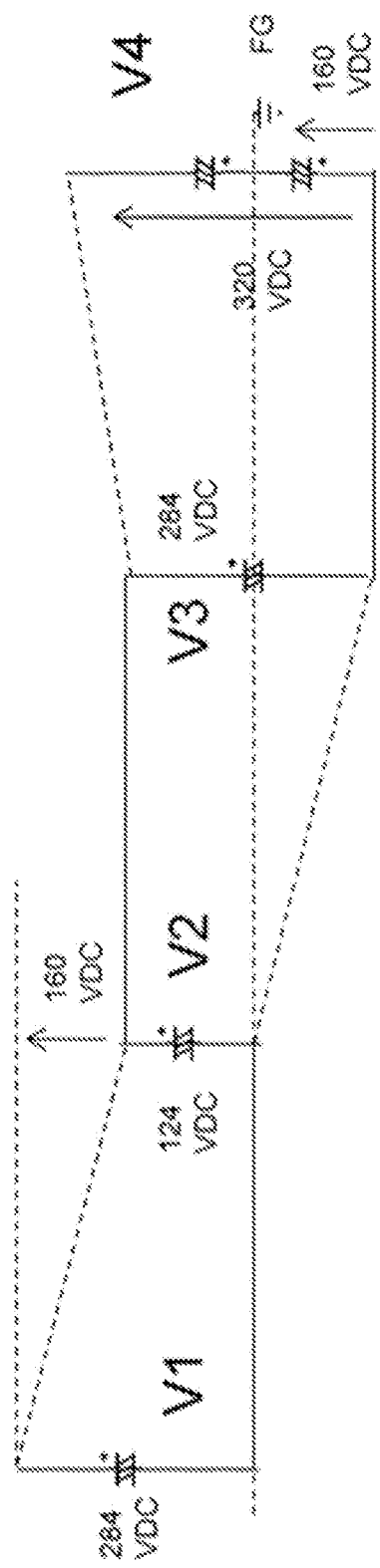

In this example, as illustrated in FIG. 10B, with the negative terminal as common, the first converter unit 21 chops the output voltage V1 of the solar cell 10 (e.g., 284 V) to a predetermined voltage V2 (e.g., 124 V), and with the positive terminal as common, the second converter unit 22 boosts the voltage V2 to a voltage V3 (e.g., 284 V) which is the same as the output of the solar cell 10. The DC-DC converter 220 in the PCS 50 boosts the voltage V3 to a predetermined voltage V4 (e.g., 320 V). In this case, as previously described the potential-to-ground of the output-side negative terminal in the DC-DC converter 220 is −160 V and the potential-to-ground at the input-side positive terminal is +124; therefore, connected to this DC-DC converter 220 with the positive terminal as common, the potential-to-ground of the input-side positive terminal of the second converter unit 22 is also +124 V. Consequently, the first converter unit 21 may establish an output voltage of 124 V to thereby create a potential-to-ground of 0 V at the negative terminal, and with the potential-to-ground at the negative terminal of the solar cell 10 as 0 V, this prevents a deterioration in the performance of the solar cell 10 due to PID.

(2.4.2)

Figure 11A:
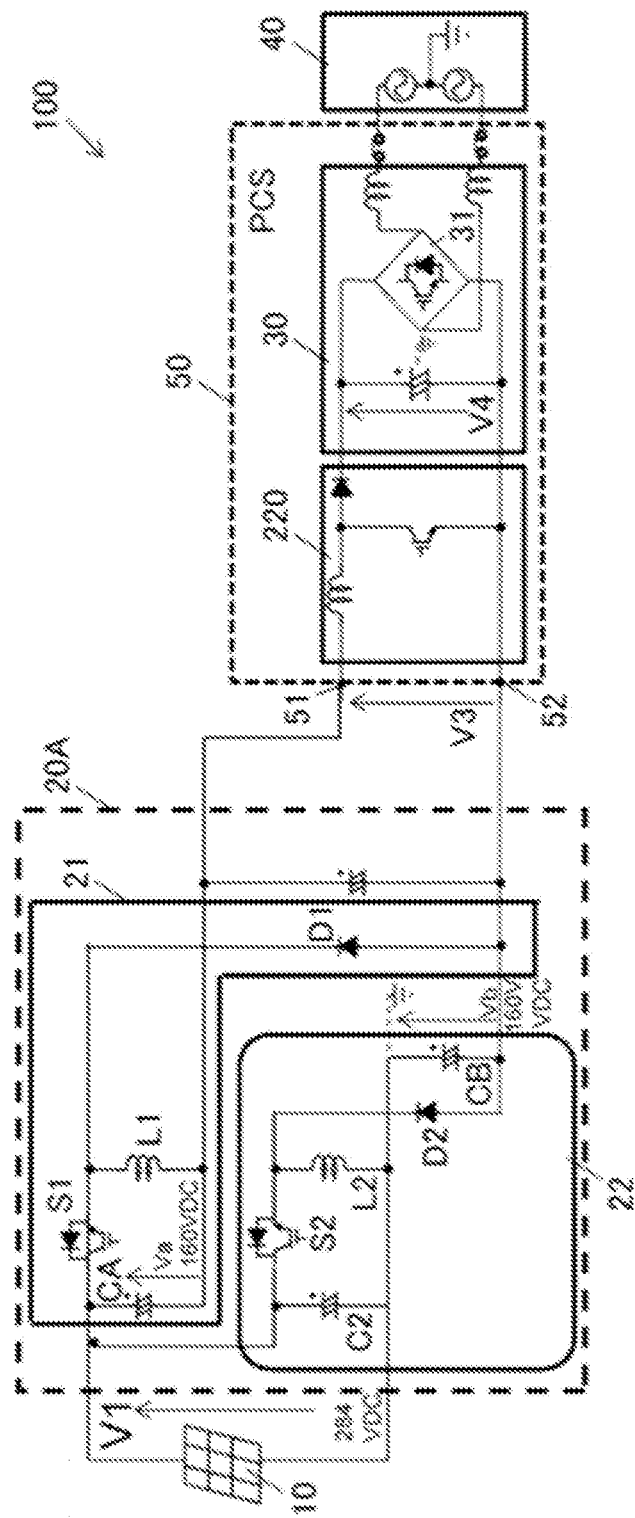
FIGS. 11A and 11B illustrate an example of a circuit configuration (2.4.2) of a converter and a power conditioner that may be provided to a solar power system.

FIG. 11A illustrates an example of a circuit configuration of a converter 20A and a PCS 50 that may be provided to a solar power system 100; the circuit configuration of the DC-DC converter 20 of FIG. 8A and the converter 20A of this example are identical; however, the parameters for converting the direct-current voltage are different. In the example in FIG. 8A the DC-DC converter 20 is connected to the inverter unit 30, while in this example the converter 20A is connected to the PCS 50. In this example the components having the same function as in the previously described solar power system 100 are given the same reference numerals and a repeated description therefor is omitted.

Figure 11B:
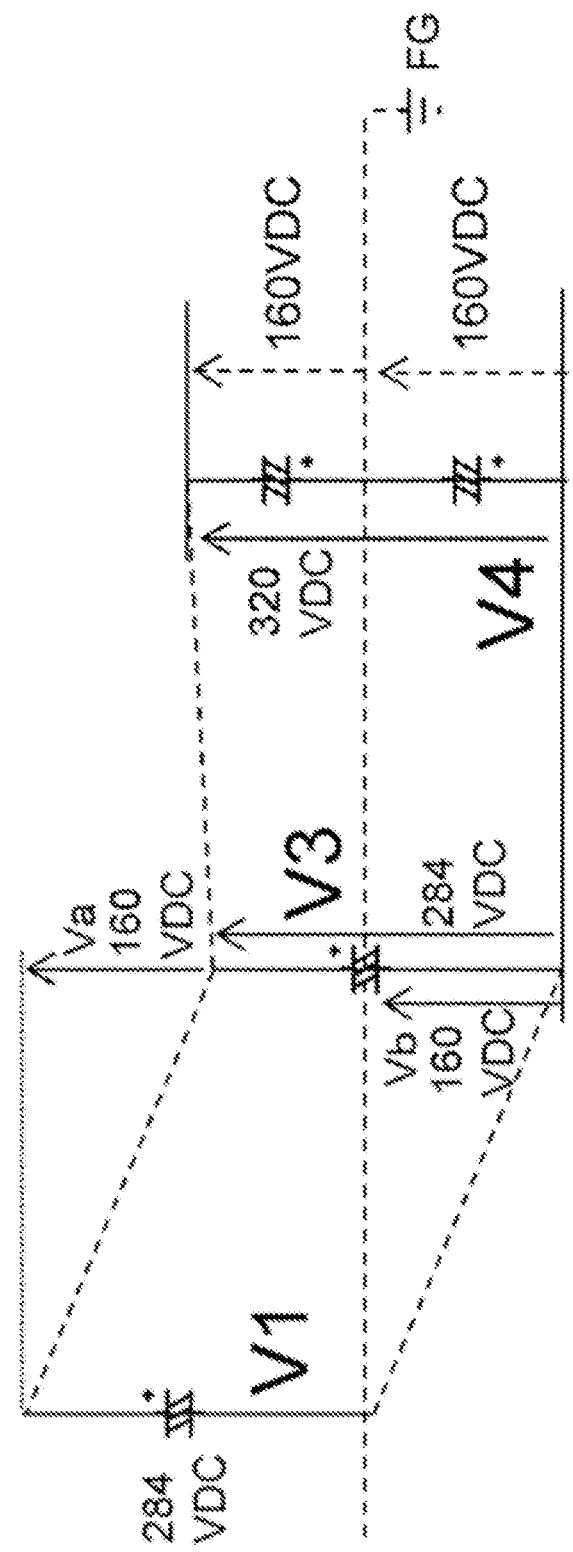

In this example, as illustrated in FIG. 11B, the output voltage from the converter 20A, i.e., the voltage V3 applied across the positive and negative external terminals 51, 52 on the direct-current side of the PCS 50, is the equal to the input voltage, i.e., the output voltage V1 of the solar cell 10 (e.g., 284 V). The DC-DC converter 220 converts the voltage V3 into a predetermined voltage V4 (e.g., 320 V), and applies this voltage to the positive and negative terminals of the inverter unit 30. In this case, since the potential-to-ground at the midpoint of the positive and negative terminals of the inverter unit 30 is 0 V, the potential-to-ground at the positive terminal is +160 V, and at the negative terminal is −160 V; therefore, the potential-to-ground at the negative external terminal 52 is −160 V, and the potential-to-ground at the positive external terminal 51 is +124 V on the direct-current side of the PCS 50. The voltage Va across the capacitor CA is established at 160 V in the first converter unit 21 with the positive terminal of the PCS 50 as common; therefore, with ground as a reference, the potential at the positive terminal of the solar cell 10 equals the potential at the positive terminal 51 of the PCS 50 (+124 V) added to the voltage Va (160 V) and is +284 V. In addition, the voltage Vb across the capacitor CB is established at 160 V in the second converter unit 22 with the negative terminal of the solar cell 10 as common; therefore, with ground as a reference, the potential at the negative terminal of the solar cell 10 equals the potential at the negative terminal 52 of the PCS 50 (−160 V) added to the voltage Vb (160 V) and is 0 V. The solar power system 100 thus prevents deterioration of the performance of the solar cell 10 due to PID.

(2.5)

Figure 12:
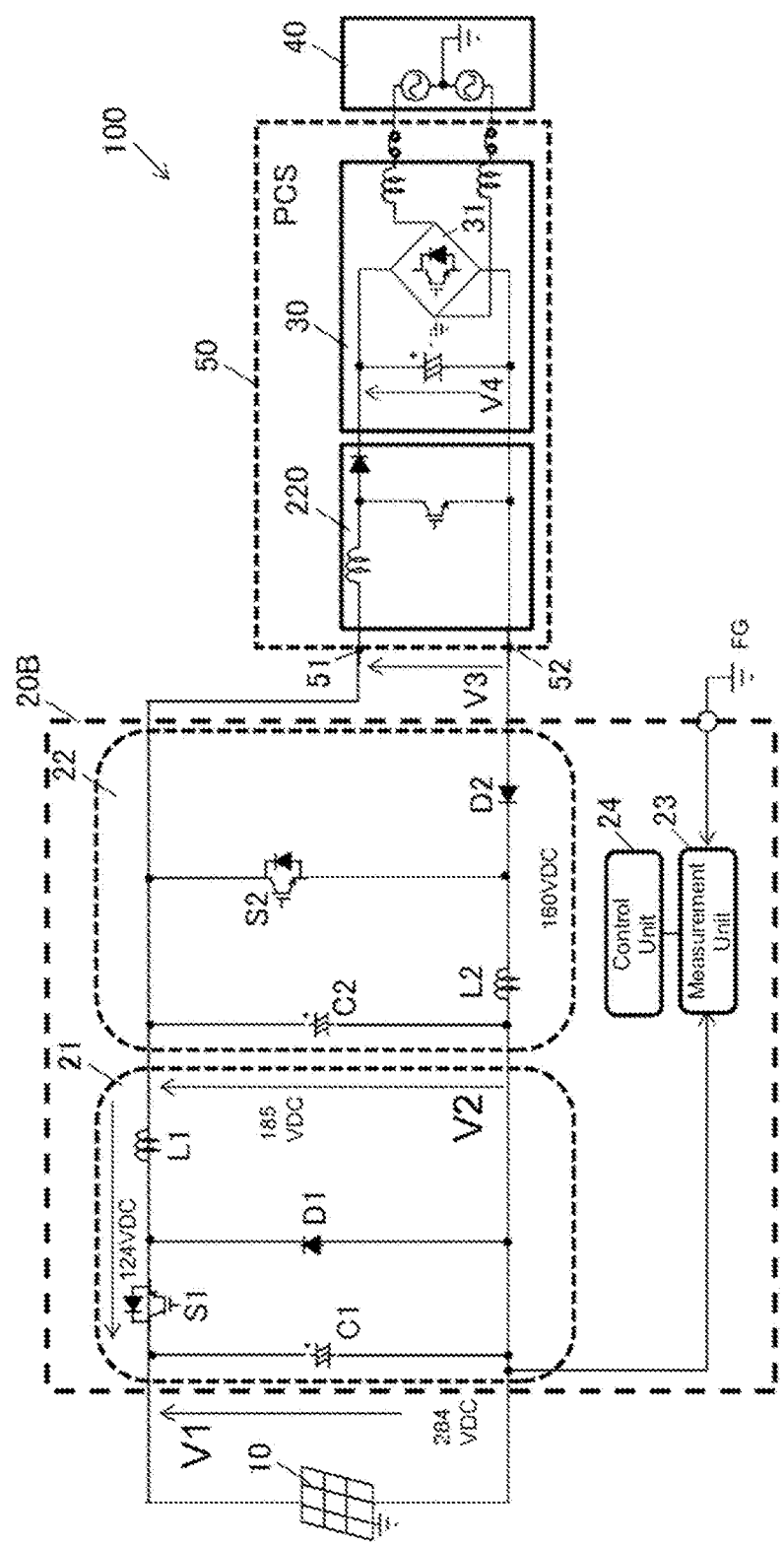
FIG. 12 illustrates an example (2.5) of a solar power system.

FIG. 12 illustrates an example of a solar power system 100; the solar power system 100 differs from the example (2.4) in that in this example, a converter 20B is provided, and includes a measurement unit 23 and a control unit 24; all other features are identical.

The measurement unit 23 is connected to the negative terminal of the solar cell 10 and to earth, and measures the potential-to-ground at said negative terminal.

The control unit 24 actuates the first switching element S1 and the second switching element S2 on the basis of the potential-to-ground measured by the measurement unit 23 so that the potential-to-ground at the negative terminal of the solar cell 10 is 0 V or greater.

As an example, fluctuations in the system voltage may change the voltage between the external terminals on the direct-current side of the PCS 50 and ground such that the potential-to-ground at the negative terminal of the solar cell 10 is less than 0 V. In this case, the control unit 24 may modify the control target value of the first switching element S1 and the second switching element S2 to adjust the potential-to-ground at the negative terminal of the solar cell 10 to 0 V or greater. In the case of a polycrystalline solar cell 10, if the potential-to-ground at the negative terminal of the solar cell 10 is less than 0 V, the potential-to-ground may be adjusted to 0 V or greater, with no adjustment when the potential-to-ground at the negative terminal exceeds 0 V. In the case of a thin-film silicon solar cell 10, if the potential-to-ground at the negative terminal of the solar cell 10 is less than 0 V or exceeds 0 V, the potential-to-ground at the negative terminal may be adjusted to 0 V.

Hereby, the potential-to-ground at the negative terminal of the solar cell 10 may be corrected to 0 V or greater when the potential-to-ground is outside a predetermined value according to fluctuations in the system voltage to more precisely prevent deterioration in the performance of the solar cell 10 due to PID. This example depicts a configuration where the measurement unit 23 and control unit 24 are added to the converter 20A of FIG. 10, however, without being limited thereto, the measurement unit 23 and control unit 24 may be added to the converter 20A in FIG. 11, and the potential-to-ground at the negative terminal of the solar cell 10 adjusted to 0 V or greater on the basis of the potential-to-ground measured by the measurement unit 23.

(2.6)

Figure 13:
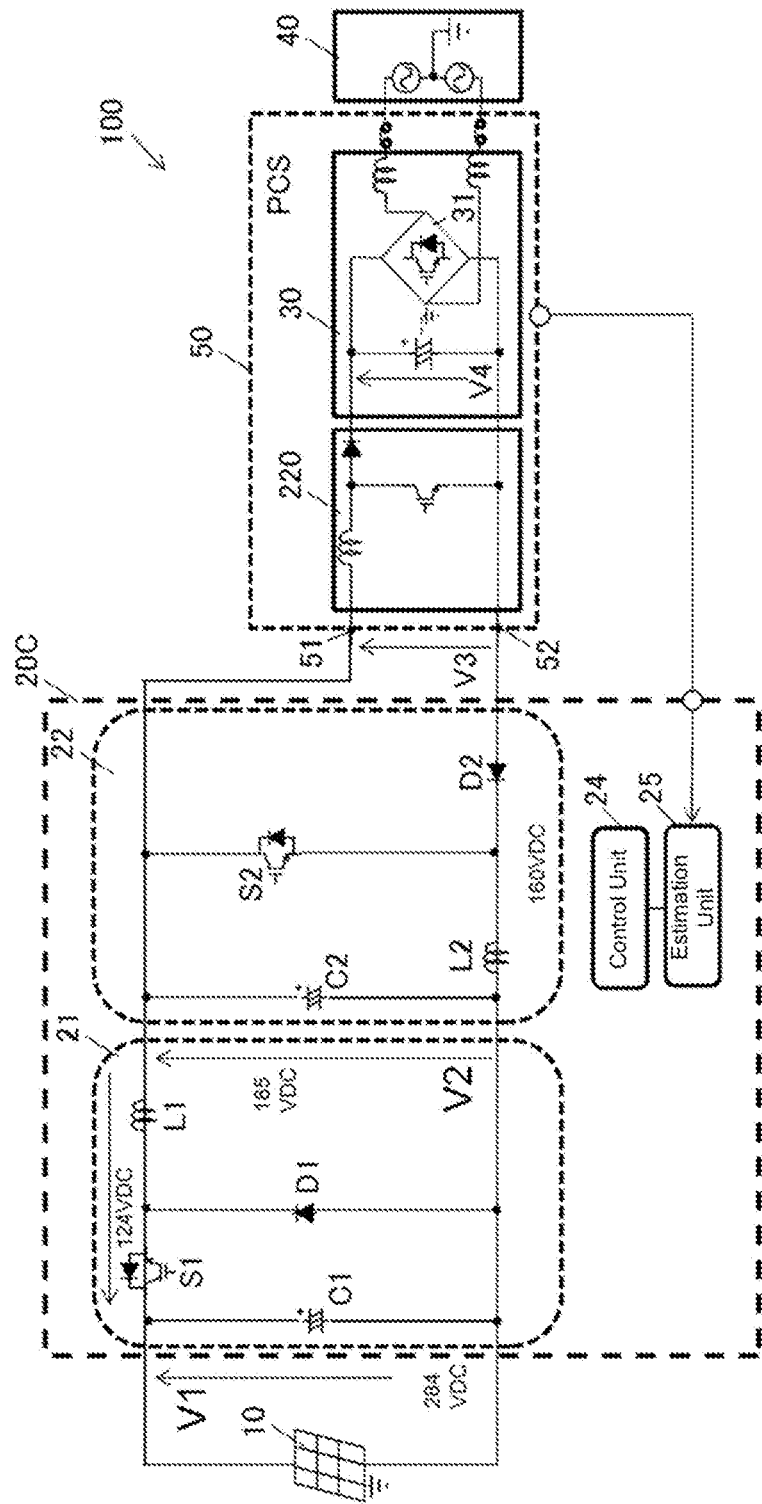
FIG. 13 illustrates an example (2.6) of a solar power system.

FIG. 13 illustrates an example of a solar power system 100; the solar power system 100 differs from the example (2.4) in that in this example, a converter 20C is provided, and includes an estimation unit 25 and a control unit 24; all other features are identical.

The estimation unit 25 acquires information representing the system voltage on the utility line to which the PCS 50 is connected or information indicating the voltage V4 between the positive and negative terminals of the inverter 31; using this information the estimation unit 25 estimates the potential-to-ground at the negative terminal of the solar cell 10.

The control unit 24 actuates the first switching element S1 and the second switching element S2 on the basis of the potential-to-ground estimated by the estimation unit 25 so that the potential-to-ground at the negative terminal of the solar cell 10 is 0 V or greater.

As an example, when the system voltage of the commercial power grid fluctuates, the voltage between ground and the external terminals on the direct-current side of the PCS 50 change, and the potential-to-ground at the negative terminal of the solar cell 10 deviates from a predetermined value; therefore, the estimation unit 25 acquires information from the PCS 50 indicating the system voltage or the voltage V4 and estimates the potential-to-ground at the negative terminal of the solar cell 10 on the basis of said system voltage or voltage V4. If the potential-to-ground estimated by the estimation unit 25 is less than 0 V, the control unit 24 changes the control target values for the first switching element S1 and the second switching element S2, and adjusts the potential-to-ground at the negative terminal of the solar cell 10 to 0 V or greater. In the case of a polycrystalline solar cell 10, the potential-to-ground at the negative terminal of the solar cell 10 of less than 0 V may be adjusted to 0 V or greater, with no adjustment to the potential-to-ground when the estimated potential-to-ground exceeds 0 V. In the case of a thin-film silicon solar cell 10, the potential-to-ground may be adjusted to 0 V when the estimated potential-to-ground is less than 0 V or exceeds 0 V.

Hereby, the potential-to-ground at the negative terminal of the solar cell 10 can be maintained at or above 0V, and prevent a deterioration in the performance of the solar cell 10 even in cases where the system voltage fluctuates. This example depicts a configuration where the estimation unit 25 and control unit 24 are added to the converter 20A of FIG. 10; however, without being limited thereto, the estimation unit 25 and control unit 24 may be added to the converter 20A in FIG. 11, and the potential-to-ground at the negative terminal of the solar cell 10 may be adjusted to 0 V or greater on the basis of the potential-to-ground estimated by the estimation unit 25.

(2.7)

Figure 14:
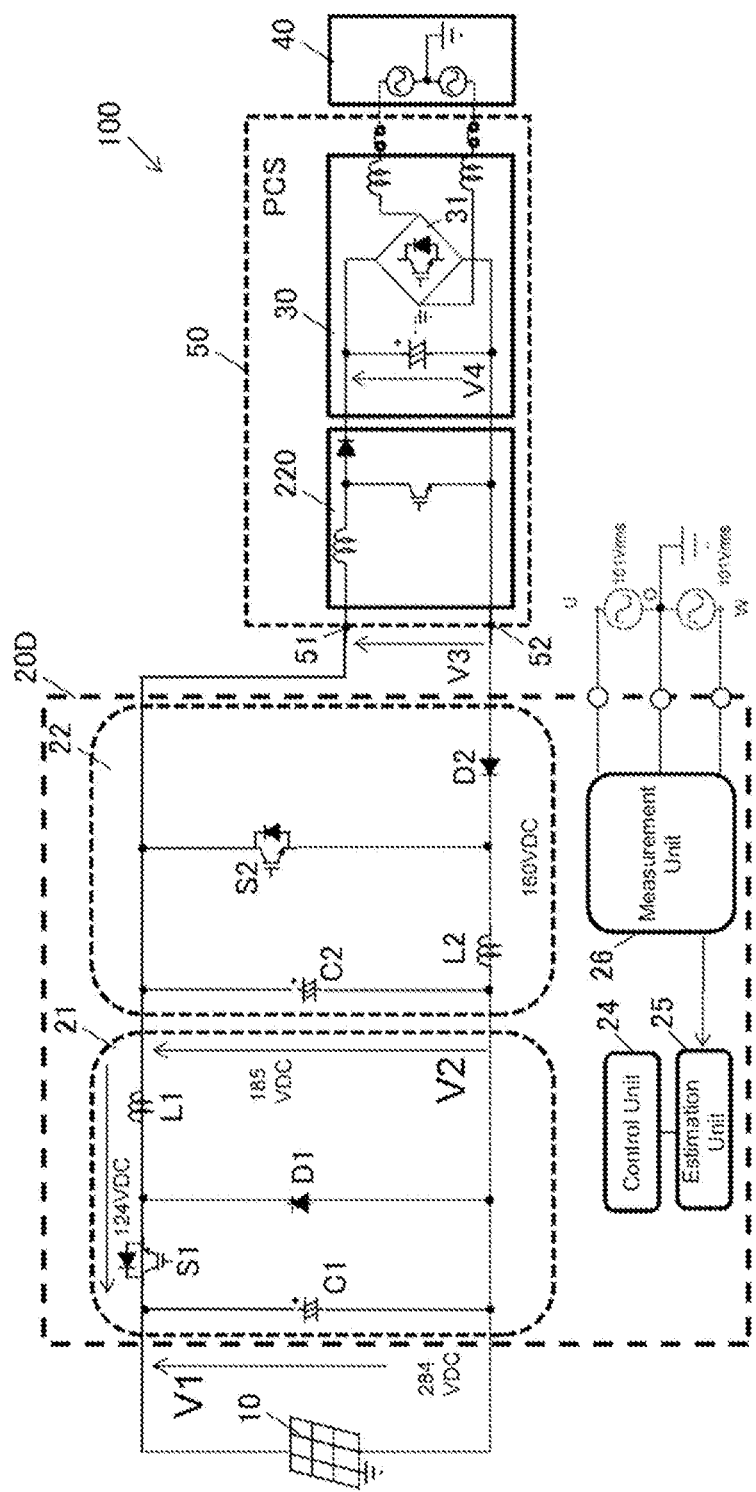
FIG. 14 illustrates an example (2.7) of a solar power system.
Figure 15:
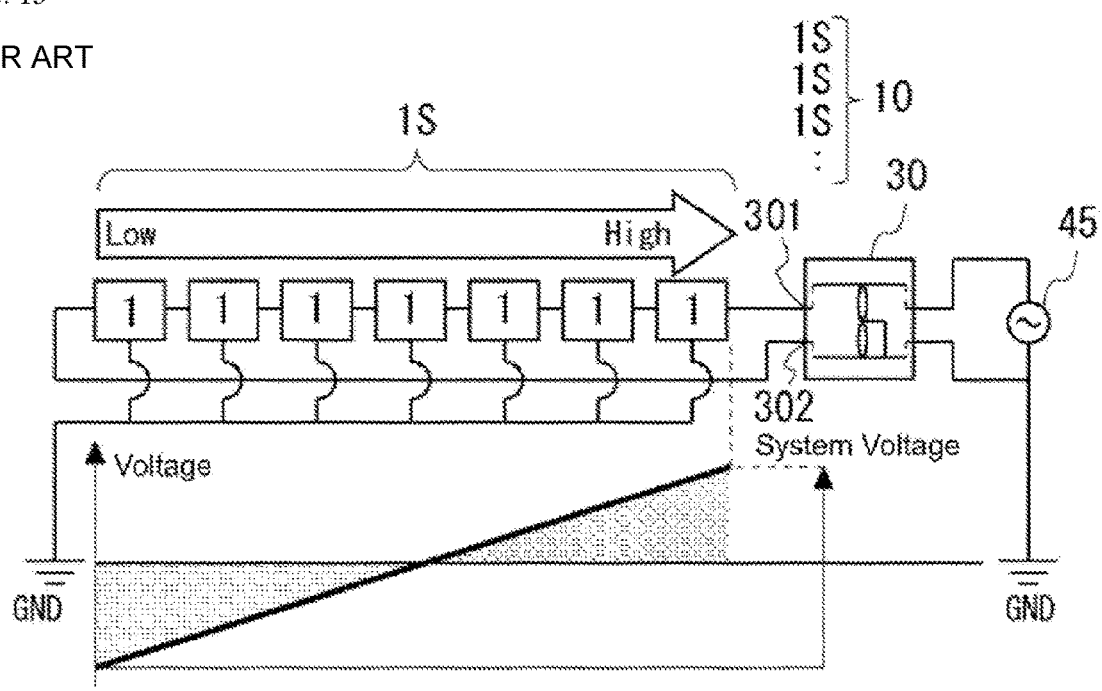
FIG. 15 is a conceptual diagram for describing one example of the PID phenomenon.

FIG. 14 illustrates an example of a solar power system 100; the solar power system 100 differs from the example (2.4) in that in this example, a converter 20D is provided, and includes a control unit 24, an estimation unit 25, and a measurement unit 26; all other features are identical.

The measurement unit 26 measures the system voltage of the power grid to which the PCS 50 is connected. The estimation unit 25 estimates the potential-to-ground at the negative terminal of the solar cell 10 from the system voltage measured by the measurement unit 26.

The control unit 24 actuates the first switching element S1 and the second switching element S2 on the basis of the potential-to-ground estimated by the estimation unit 25 so that the potential-to-ground at the negative terminal of the solar cell 10 is 0 V or greater.

As an example, when the system voltage of the commercial power grid fluctuates, the voltage between ground and the external terminals on the direct-current side of the PCS 50 changes, and the potential-to-ground at the negative terminal of the solar cell 10 deviates from a predetermined value; therefore, the measurement unit 26 measures the system voltage of the commercial power grid and the estimation unit 25 estimates the potential-to-ground at the negative terminal of the solar cell 10 on the basis of said system voltage. If the potential-to-ground estimated by the estimation unit 25 is less than 0 V, the control unit 24 changes the control target values for the first switching element S1 and the second switching element S2, and adjusts the potential-to-ground at the negative terminal of the solar cell 10 to 0 V or greater. In the case of a polycrystalline solar cell 10, the potential-to-ground at the negative terminal of the solar cell 10 of less than 0 V may be adjusted to 0 V or greater, with no adjustment to the potential-to-ground when the estimated potential-to-ground exceeds 0 V. In the case of a thin-film silicon solar cell 10, the potential-to-ground may be adjusted to 0 V when the estimated potential-to-ground is less than 0 V or exceeds 0 V.

Hereby, the potential-to-ground at the negative terminal of the solar cell 10 can be maintained at or above 0V, and prevent a deterioration in the performance of the solar cell 10 even in cases where the system voltage fluctuates. This example depicts a configuration where the control unit 24, estimation unit 25, and measurement unit 26 are added to the converter 20A of FIG. 10; however, without being limited thereto, the control unit 24, estimation unit 25, and measurement unit 26 may be added to the converter 20A in FIG. 11; the potential-to-ground at the negative terminal of the solar cell 10 may be estimated from the system voltage measured by the measurement unit 26, and the potential-to-ground at the negative terminal of the solar cell 10 adjusted to 0 V or greater on the basis of the estimated potential-to-ground.

3. Modification Examples

An example of the converter (20) described herein:
is configured for connection between a solar cell (10) and an inverter (31) configured to convert direct current power output from said solar cell (10) into alternating current power; and when outputting the direct-current power generated by the solar cell (10) to the inverter side, the converter (20) increases the potential-to-ground at the negative terminal of the solar cell (10) to greater than the potential-to-ground at the negative terminal of the inverter (31).

The above-described embodiment and modifications of the present invention are merely examples, and the present invention is not limited thereto. The distinctive configurations presented in the above-described embodiment and modification examples may of course be combined insofar as the combinations do not depart from the spirit and scope of the present invention.

REFERENCE NUMERALS

10 Solar cell
20 DC-DC converter
20A, 20B, 20C, 20D Converter
21 First converter unit
22 Second converter unit
23 Measurement unit
24 Control unit
25 Estimation unit
26 Measurement unit
30 Inverter unit
31 Inverter
40 Distribution panel
100 Solar power system

The invention claimed is:

1. A converter configured for connecting between a solar cell and an inverter configured to convert direct-current power output from the solar cell into alternating current power, the converter being configured to increase a potential-to-ground at a negative terminal of the solar cell to greater than a potential-to-ground at a negative terminal of the inverter while outputting the direct-current power generated by the solar cell to an inverter side, the converter comprising:
   a first converter circuit configured to establish a potential-to-ground at a positive terminal of the solar cell as greater than or equal to a potential-to-ground of a positive terminal of the inverter; and
   a second converter circuit configured to establish the potential-to-ground at the negative terminal of the solar cell as greater than the potential-to-ground at the negative terminal of the inverter; wherein
   the first converter circuit comprises:
      a first inductor with one end thereof connected to the positive terminal of the inverter;
      a first switching element configured for opening and closing a path between the positive terminal of the solar cell and the other end of the first inductor; and
      a first diode with a cathode connected to the other end of the first inductor and to an end of the first switching element on an inductor side, and an anode connected to the negative terminal of the solar cell; and
   the second converter circuit comprises:
      a second inductor with one end thereof connected to the negative terminal of the solar cell;
      a second switching element configured for opening and closing the path between positive terminal of the first converter circuit and the positive terminal of the inverter, and the other end of the second inductor; and
      a second diode with a cathode connected to the other end of the second inductor and an end of the second switching element on the inductor side, and an anode connected to the negative terminal of the inverter.

2. The converter according to claim 1, wherein
   the converter is configured as a unit separate from a power conditioner that comprises the inverter, the converter being connected to the inverter via a positive external terminal and a negative external terminal on a direct-current side of the power conditioner,
   the converter is configured to establish a voltage between the positive terminal of the solar cell and negative terminal of the solar cell to be the same as a voltage applied between the positive external terminal and the negative external terminal on the direct-current side of the power conditioner,
   the one end of the first inductor is connected to the positive terminal of the inverter via a first external terminal of the inverter on the direct-current side of the power conditioner,
   the one end of the second switching element is connected to the positive terminal of the inverter via the first external terminal of the inverter on the direct-current side of the power conditioner, and the anode of the second diode is connected to the negative terminal of the inverter via a second external terminal of the inverter on the direct-current side of the power conditioner.

3. The converter according to claim 1, further comprising:
a measurement unit configured to measure the potential-to-ground at the negative terminal of the solar cell; and
a control unit configured to actuate the switching elements on the basis of the potential-to-ground measured, so that the potential-to-ground at the negative terminal of the solar cell is 0 V or greater.

4. The converter according to claim 1, further comprising:
an estimation unit configured to acquire information from a power conditioner indicating a system voltage of a power grid to which the power conditioner is connected or indicating a voltage between the positive terminal of the inverter and the negative terminal of the inverter, and to estimate the potential-to-ground of the negative terminal of the solar cell from the information; and
a control unit configured to actuate the switching elements on the basis of the potential-to-ground estimated by the estimation unit so that the potential-to-ground at the negative terminal of the solar cell is 0 V or greater.

5. The converter according to claim 1, further comprising:
a measurement unit configured to measure a system voltage for a power grid to which a power conditioner is connected;
an estimation unit configured to estimate the potential-to-ground at the negative terminal of the solar cell on the basis of the system voltage measured by the measurement unit; and
a control unit configured to actuate the switching elements on the basis of the potential-to-ground estimated by the estimation unit so that the potential-to-ground at the negative terminal of the solar cell is 0 V or greater.

6. A solar power system comprising:
the converter according to claim 1;
the solar cell; and
the inverter.

7. The converter according to claim 2, further comprising:
a measurement unit configured to measure the potential-to-ground at the negative terminal of the solar cell; and
a control unit configured to actuate the switching elements on the basis of the potential-to-ground measured, so that the potential-to-ground at the negative terminal of the solar cell is 0 V or greater.

8. The converter according to claim 2, further comprising:
an estimation unit configured to acquire information from the power conditioner indicating a system voltage of a power grid to which the power conditioner is connected or indicating a voltage between the positive terminal of the inverter and the negative terminal of the inverter, and to estimate the potential-to-ground of the negative terminal of the solar cell from the information; and
a control unit configured to actuate the switching elements on the basis of the potential-to-ground estimated by the estimation unit so that the potential-to-ground at the negative terminal of the solar cell is 0 V or greater.

9. The converter according to claim 2, further comprising:
a measurement unit configured to measure a system voltage for a power grid to which the power conditioner is connected;
an estimation unit configured to estimate the potential-to-ground at the negative terminal of the solar cell on the basis of the system voltage measured by the measurement unit; and
a control unit configured to actuate the switching elements on the basis of the potential-to-ground estimated by the estimation unit so that the potential-to-ground at the negative terminal of the solar cell is 0 V or greater.

10. A solar power system comprising:
the converter according to claim 2;
the solar cell; and
the inverter.

11. A converter configured for connecting between a solar cell and an inverter configured to convert direct-current power output from the solar cell into alternating current power, the converter being configured to increase a potential-to-ground at a negative terminal of the solar cell to greater than a potential-to-ground at a negative terminal of the inverter while outputting the direct-current power generated by the solar cell to an inverter side, the converter comprising:
a first converter circuit configured to establish a potential-to-ground at a positive terminal of the solar cell as greater than or equal to a potential-to-ground of a positive terminal of the inverter; and
a second converter circuit configured to establish the potential-to-ground at the negative terminal of the solar cell as greater than the potential-to-ground at the negative terminal of the inverter; wherein
the first converter circuit comprises:
a first inductor with one end thereof connected to the positive terminal of the inverter;
a first switching element configured for opening and closing a path between the positive terminal of the solar cell and the other end of the first inductor; and
a first diode with a cathode connected to the other end of the first inductor and to an end of the first switching element on an inductor side, and an anode connected to the negative terminal of the inverter, and
the second converter circuit comprises:
a second inductor with one end thereof connected to the negative terminal of the solar cell;
a second switching element configured for opening and closing the path between the positive terminal of the solar cell and the other end of the second inductor; and
a second diode with a cathode connected to the other end of the second inductor and an end of the second switching element on the inductor side, and an anode connected to the negative terminal of the inverter.

12. The converter according to claim 11, further comprising:
a measurement unit configured to measure the potential-to-ground at the negative terminal of the solar cell; and
a control unit configured to actuate the switching elements on the basis of the potential-to-ground measured, so that the potential-to-ground at the negative terminal of the solar cell is 0 V or greater.

13. The converter according to claim 11, further comprising:
an estimation unit configured to acquire information from a power conditioner indicating a system voltage of a power grid to which the power conditioner is connected or indicating a voltage between the positive terminal of the inverter and the negative terminal of the inverter, and to estimate the potential-to-ground of the negative terminal of the solar cell from the information; and a control unit configured to actuate the switching elements on the basis of the potential-to-ground estimated by the estimation unit so that the potential-to-ground at the negative terminal of the solar cell is 0 V or greater.

14. The converter according to claim 11, further comprising:

a measurement unit configured to measure a system voltage for a power grid to which a power conditioner is connected;

an estimation unit configured to estimate the potential-to-ground at the negative terminal of the solar cell on the basis of the system voltage measured by the measurement unit; and a control unit configured to actuate the switching elements on the basis of the potential-to-ground estimated by the estimation unit so that the potential-to-ground at the negative terminal of the solar cell is 0 V or greater.

15. A solar power system comprising:
the converter according to claim 11;
the solar cell; and
the inverter.

16. The converter according to claim 11, wherein
the converter is configured as a unit separate from a power conditioner that comprises the inverter, the converter being connected to the inverter via a positive external terminal and a negative external terminal on a direct-current side of the power conditioner,
the converter is configured to establish a voltage between the positive terminal of the solar cell and the negative terminal of the solar cell and a voltage applied between the positive external terminal and the negative external terminal on the direct-current side of the power conditioner as the same as each other,
the one end of the first inductor is connected to the positive terminal of the inverter via a first external terminal of the inverter on the direct-current side of the power conditioner,
the anode of the first diode is connected to the negative terminal of the inverter via the first external terminal of the inverter on the direct-current side of the power conditioner, and the anode of the second diode is connected to the negative terminal of the inverter via a second external terminal of the inverter on the direct-current side of the power conditioner.

17. The converter according to claim 16, further comprising:

a measurement unit configured to measure the potential-to-ground at the negative terminal of the solar cell; and a control unit configured to actuate the switching elements on the basis of the potential-to-ground measured, so that the potential-to-ground at the negative terminal of the solar cell is 0 V or greater.

18. The converter according to claim 16, further comprising:

an estimation unit configured to acquire information from the power conditioner indicating a system voltage of a power grid to which the power conditioner is connected or indicating a voltage between the positive terminal of the inverter and the negative terminal of the inverter, and to estimate the potential-to-ground of the negative terminal of the solar cell from the information; and a control unit configured to actuate the switching elements on the basis of the potential-to-ground estimated by the estimation unit so that the potential-to-ground at the negative terminal of the solar cell is 0 V or greater.

19. The converter according to claim 16, further comprising:

a measurement unit configured to measure a system voltage for a power grid to which the power conditioner is connected;

an estimation unit configured to estimate the potential-to-ground at the negative terminal of the solar cell on the basis of the system voltage measured by the measurement unit; and a control unit configured to actuate the switching elements on the basis of the potential-to-ground estimated by the estimation unit so that the potential-to-ground at the negative terminal of the solar cell is 0 V or greater.

20. A solar power system comprising:
the converter according to claim 16;
the solar cell; and
the inverter.

* * * * *